(12) United States Patent
Yamano

(10) Patent No.: US 8,953,071 B2
(45) Date of Patent: Feb. 10, 2015

(54) LENS OPTICAL UNIT AND IMAGING DEVICE

(75) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 338 days.

(21) Appl. No.: 13/598,979

(22) Filed: Aug. 30, 2012

(65) Prior Publication Data

US 2013/0063634 A1 Mar. 14, 2013

(30) Foreign Application Priority Data

Sep. 13, 2011 (JP) ................. 2011-199649

(51) Int. Cl.
| | |
|---|---|
| *H04N 3/14* | (2006.01) |
| *H04N 5/262* | (2006.01) |
| *G02B 9/62* | (2006.01) |
| *G02B 9/00* | (2006.01) |
| *G02B 15/14* | (2006.01) |
| *G02B 9/04* | (2006.01) |
| *G02B 13/18* | (2006.01) |
| *G02B 13/00* | (2006.01) |
| *H04N 5/369* | (2011.01) |

(52) U.S. Cl.
CPC .......... *G02B 13/006* (2013.01); *G02B 13/0035* (2013.01); *H04N 5/3696* (2013.01)
USPC ................. 348/294; 348/208.11; 348/240.99; 359/760; 359/754; 359/692; 359/795; 359/717

(58) Field of Classification Search
USPC ........ 348/208.11, 240.99, 335, 294; 359/760, 359/754, 692, 689, 795, 717
See application file for complete search history.

(56) References Cited

U.S. PATENT DOCUMENTS 6,128,140 A * 10/2000 Yoneyama ..................... 359/687
6,243,213 B1 * 6/2001 Mori ............................. 359/681
(Continued)

FOREIGN PATENT DOCUMENTS

JP 2010-109096 5/2010

*Primary Examiner* — Sinh Tran
*Assistant Examiner* — Xi Wang
(74) *Attorney, Agent, or Firm* — Rader, Fishman & Grauer PLLC

(57) ABSTRACT

Provided is a lens optical unit, including at least one lens arranged at an object side of a solid-state image sensor. An imaging plane of the image sensor has a non-planar shape causing a sag amount in an optical axis direction to increase as a distance from an optical axis increases, and satisfies the expression: ρ×Sag>0, where ρ represents a Petzval curvature of an optical unit represented by ρ:

$$\rho = \sum_k \frac{1}{r_k} \cdot \left( \frac{1}{n'_k} - \frac{1}{n_k} \right),$$

$r_k$ represents a curvature radius of a $k^{th}$ lens surface from the object side, $n_k$ represents a refractive index of a medium before being incident to the $k^{th}$ lens surface from the object side, $n'_k$ represents a refractive index of a medium after being emitted from the $k^{th}$ lens surface from the object side, and Sag represents a sag amount in the optical axis direction related to a given point other than the optical axis on the imaging plane.

10 Claims, 14 Drawing Sheets

(56) References Cited

U.S. PATENT DOCUMENTS

| | | | |
|---|---|---|---|
| 6,268,966 B1 * | 7/2001 | Ishii et al. | 359/692 |
| 6,738,057 B1 * | 5/2004 | Campbell | 345/611 |
| 6,751,028 B1 * | 6/2004 | Horiuchi | 359/687 |
| 2008/0144193 A1 * | 6/2008 | Adachi | 359/770 |
| 2011/0124373 A1 * | 5/2011 | Fukuta | 455/556.1 |

* cited by examiner

4 · · · LENS OPTICAL UNIT
G1 · · · FIRST NEGATIVE LENS
G2 · · · FIRST POSITIVE LENS
G3 · · · SECOND NEGATIVE LENS
G4 · · · SECOND POSITIVE LENS
IMG · · · IMAGING PLANE

LENS OPTICAL UNIT AND IMAGING DEVICE

BACKGROUND

The present technology relates to a lens optical unit and an imaging device. More particularly, the present technology relates to a technical field of a lens optical unit and an imaging device which are suitable for, particularly, digital still cameras, video cameras, monitoring cameras, and the like, which employ a solid-state image sensor as a small, high-performance imaging unit.

In recent years, the market for imaging devices such as digital cameras has significantly increased, and users' demands for digital cameras and the like are diverse. Further, in recent years, the need for brightness of a shooting lens and an increase in the size of an imaging element which is effective in implementing low-noise shooting and a high dynamic range has increased, not to mention the need for an increase in image quality, a reduction in size, and a reduction in thickness.

It is generally known that when the size of an imaging element increases, a lens optical unit increases accordingly. Particularly, in a lens optical unit for a digital camera employing a solid-state image sensor as an imaging unit, an acceptable level of an angle of a light ray incident on an imaging plane is small, and in order to cause a light ray to be as vertically incident as possible, an optical design close to a telecentric optical unit is necessary. Thus, it is difficult to implement a significantly small optical unit.

Further, in order to implement high resolution in an entire screen ranging from the center of a captured image or video to the edge, it is necessary to appropriately correct the field curvature of an optical image formed on the imaging plane. However, in order to implement this, it is necessary to add a collecting lens for correcting the field curvature to an optical unit. Thus, this serves as a big restriction to a size reduction of an optical unit. In a bright lens of an F number which is shallow in depth of focus, particularly, this restriction is large, and it is difficult to reduce the size.

An imaging device in which an image plane converting element having a curved surface is arranged at an object side of a solid-state image sensor has been proposed as an imaging device that performs field curvature correction (see Japanese Patent Application Laid Open (JP-A) No. 2010-109096).

SUMMARY

However, in the lens optical unit disclosed in JP-A No. 2010-109096, the image plane converting element is configured to perform field curvature correction, but no concrete design on a curved surface shape may be performed, and thus sufficient field curvature correction is unlikely to be performed.

Further, in the lens optical unit disclosed in JP-A No. 2010-109096, since the image plane converting element is arranged at the object side of the solid-state image sensor, the total optical length becomes long, and thus it causes difficulty in reducing the size.

The present technology is made to solve the above-mentioned problems, and it is desirable to provide a lens optical unit and an imaging device, which are capable of implementing high optical performance by performing size reduction and sufficient field curvature correction.

According to an embodiment of the present disclosure, there is provided a lens optical unit, including at least one lens that is arranged at an object side of a solid-state image sensor. An imaging plane of the solid-state image sensor has a non-planar shape that causes a sag amount in an optical axis direction to increase as a distance from an optical axis increases, and a conditional expression (1) is satisfied:

$$\rho \times Sag > 0 \quad (1)$$

where $\rho$ represents a Petzval curvature of an optical unit represented by $\rho$:

$$\rho = \sum_k \frac{1}{r_k} \cdot \left( \frac{1}{n'_k} - \frac{1}{n_k} \right)$$

$r_k$ represents a curvature radius of a $k^{th}$ lens surface from the object side, $n_k$ represents a refractive index of a medium before being incident to the $k^{th}$ lens surface from the object side, $n'_k$ represents a refractive index of a medium after being emitted from the $k^{th}$ lens surface from the object side, and Sag represents a sag amount (an image side direction is positive) in the optical axis direction related to a given point other than the optical axis on the imaging plane.

Thus, in the lens optical unit, it is possible to match an imaging plane with an image plane at which an optimal resolution of an optical image is obtained.

In the above-mentioned lens optical unit, it is preferable that a conditional expression (2) be satisfied.

$$\rho < 0. \quad (2)$$

When the conditional expression (2) is satisfied, the Petzval curvature has a negative sign.

In the above-mentioned lens optical unit, it is preferable that the non-planar shape of the imaging plane in the solid-state image sensor be a curved surface shape that is rotationally symmetric about the optical axis.

The non-planar shape of the imaging plane in the solid-state image sensor is the curved surface shape that is rotationally symmetric about the optical axis, and thus the lens surface shape of each of lenses configuring the lens optical unit can be formed in the rotationally symmetric shape.

In the above-mentioned lens optical unit, it is preferable that an angle at which a main light ray having a maximum angle of field is incident to the imaging plane in a state of shooting at infinity in an entire zoom area satisfy a conditional expression (3): $\theta_{max} < 45°$, where $\theta_{max}$ represents an angle at which a main light ray having a maximum angle of field is incident to the imaging plane (vertical incidence is set to 0°).

As the angle at which a main light ray having a maximum angle of field is incident on the imaging plane in a state of shooting at infinity in an entire zoom area satisfies the conditional expression (3), an angle of a light ray incident on the solid-state image sensor is reduced.

In the above-mentioned lens optical unit, it is preferable that the entire imaging plane of the solid-state image sensor have a spherical shape with the same curvature.

Since the entire imaging plane of the solid-state image sensor has a spherical shape with the same curvature, the shape of the imaging plane can be simplified.

In the above-mentioned lens optical unit, it is preferable that the imaging plane of the solid-state image sensor and a focal length of the optical unit satisfy a conditional expression (4): $-5.0 < R_{img}/f_{inf} < -1.0$, where $R_{img}$ represents a curvature radius of the imaging plane of the solid-state image sensor, and $f_{inf}$ represents a focal length of the optical unit at the time of focusing at infinity.

As the imaging plane of the solid-state image sensor and the focal length of the optical unit satisfy the conditional expression (4), a degree of the curvature of the imaging plane is reduced, and the curvature of the imaging plane of the solid-state image sensor becomes large with respect to the focal length of the lens optical unit.

In the above-mentioned lens optical unit, it is preferable that a total of four lenses including two positive lenses and two negative lenses be arranged as the lens.

As a total of four lenses including two positive lenses and two negative lenses are arranged at the lens, various kinds of aberration correction can be performed in a state in which the number of lenses configuring the lens optical unit is small.

In the above-mentioned lens optical unit, it is preferable that a lens closest to an image side be a concave meniscus lens having a shape which is convex toward the image side.

As the lens closest to the image side has the concave meniscus lens having the shape which is convex toward the image side, magnification by the lens closest to the image side can be increased.

In the above-mentioned lens optical unit, it is preferable that an aspheric surface be formed on a lens surface closest to the image side.

As the aspheric surface is formed on the lens surface closest to the image side, correction of astigmatism of the optical unit can be appropriately performed.

According to an embodiment of the present disclosure, there is provided an imaging device, including a lens optical unit, and a solid-state image sensor that converts an optical image formed by the lens optical unit into an electrical signal. The lens optical unit includes at least one lens arranged at an object side of the solid-state image sensor, an imaging plane of the solid-state image sensor has a non-planar shape that causes a sag amount in an optical axis direction to increase as a distance from an optical axis increases, and a conditional expression (1) is satisfied:

$$\rho \times \text{Sag} > 0 \quad (1)$$

where $\rho$ represents a Petzval curvature of an optical unit represented by $\rho$:

$$\rho = \sum_k \frac{1}{r_k} \cdot \left( \frac{1}{n'_k} - \frac{1}{n_k} \right)$$

$r_k$ represents a curvature radius of a $k^{th}$ lens surface from the object side, $n_k$ represents a refractive index of a medium before being incident to the $k^{th}$ lens surface from the object side, $n'_k$ represents a refractive index of a medium after being emitted from the $k^{th}$ lens surface from the object side, and Sag represents a sag amount (an image side direction is positive) in the optical axis direction related to a given point other than the optical axis in the imaging plane.

Accordingly, in the imaging device, it is possible to match an imaging plane with the image plane at which an optimal resolution of the optical image is obtained.

According to the embodiments of the present technology described above, it is possible to provide a lens optical unit and an imaging device, which are capable of implementing high optical performance by performing size reduction and sufficient field curvature correction.

DETAILED DESCRIPTION OF THE EMBODIMENT(S)

Figure 1:
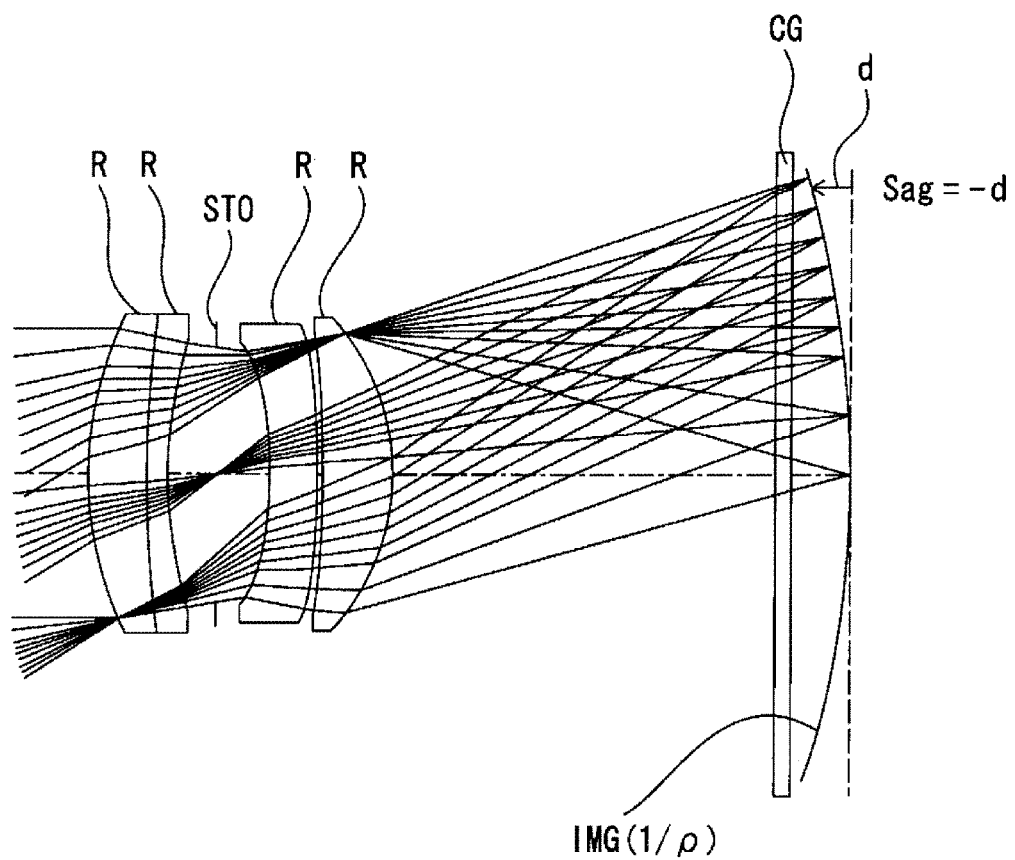
FIG. 1 illustrates an exemplary embodiment for embodying a lens optical unit and an imaging device according to the present technology together with FIGS. 2 to 4, and is a conceptual diagram illustrating a configuration and an optical path.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, exemplary embodiments of embodying a lens optical unit and an imaging device according to the present technology will be described.

[Configuration of Lens Optical Unit]

In the lens optical unit according to the present technology, at least one lens R is arranged at the object side of a solid-state image sensor, and an imaging plane IMG of the solid-state image sensor has a non-planar shape that causes a sag amount d in an optical axis direction to increase as a distance from an optical axis increases as illustrated in FIG. 1. A cover glass CG is arranged at the object side of the imaging plane IMG.

Figure 2:
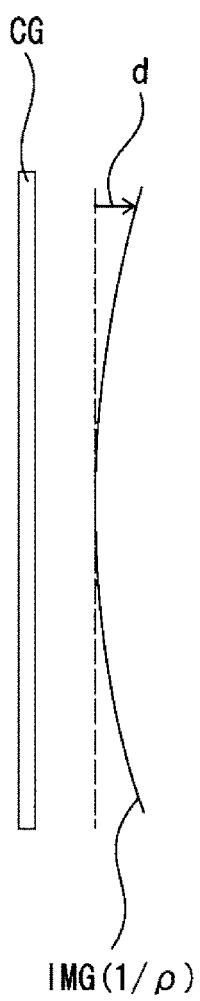
FIG. 2 is a conceptual diagram illustrating an example of an imaging plane of a different shape.

FIG. 1 illustrates an example in which the imaging plane IMG is formed in a non-planar shape which is concave to the object side. However, the imaging plane IMG may be formed in a non-planar shape which is convex to the object side as illustrated in FIG. 2.

The imaging plane IMG may not have the shape that is rotationally symmetric about the optical axis and may not have a spherical shape.

When the lens optical unit has the above configuration, even when a large field curvature aberration occurs in the lens optical unit, it is possible to match an imaging plane with an image plane at which an optimal resolution of an optical image is obtained, and thus the excellent resolution can be secured in the entire screen from the center of an image or a video to the most peripheral part (the outermost circumferential part).

Further, the lens optical unit according to the present technology is configured to satisfy the following conditional expression (1).

$$\rho \times Sag > 0 \quad (1)$$

Here, $\rho$: Petzval curvature of an optical unit represented by $\rho$:

$$\rho = \sum_k \frac{1}{r_k} \cdot \left( \frac{1}{n'_k} - \frac{1}{n_k} \right)$$

$r_k$: curvature radius of a $k^{th}$ lens surface from the object side $n_k$: refractive index of a medium before being incident to the $k^{th}$ lens surface from the object side $n'_k$: refractive index of a medium after being emitted from the $k^{th}$ lens surface from the object side Sag: sag amount (an image side direction is positive) in the optical axis direction related to a given point other than the optical axis in the imaging plane The conditional expression (1) is equation formula to specify a state of the field curvature aberration taken by the lens optical unit and an optimal condition of the non-planar shape taken by the imaging plane of the solid-state image sensor.

Here, when the conditional expression (1) is too small and falls below a lower limit, a direction of the field curvature of the lens optical unit and a direction of the shape of the imaging plane of the solid-state image sensor change in opposite directions to each other, and thus fatal degradation in the image quality is caused.

Thus, when the lens optical unit satisfies the conditional expression (1), the direction of the field curvature of the lens optical unit and the direction of the shape of the imaging plane of the solid-state image sensor do not change in opposite directions to each other, and thus the field curvature aberration is successfully corrected, and the image quality is improved.

Further, in the lens optical unit according to the present technology, the imaging plane IMG is formed in the non-planar shape in which the sag amount d in the optical axis direction increases as the distance from the optical axis increases, and as the conditional expression (1) is satisfied, the restriction of an incident light ray on the imaging plane IMG is reduced, and thus the number of lenses can be reduced.

Thus, size reduction can be implemented, and high optical performance can be secured.

Preferably, the lens optical unit according to an embodiment of the present technology satisfies the following conditional expression (2).

$$\rho < 0 \quad (2)$$

Here, $\rho$ represents the Petzval curvature in the conditional expression (1).

The conditional expression (2) is a formula specifying a state of the field curvature aberration taken by the lens optical unit.

It is generally well known that in order to reduce the size of the lens optical unit, it is desirable to design the exit pupil position of the lens optical unit to have a negative sign. However, when the Petzval curvature is too large and exceeds an upper limit of the conditional expression (2), it means the Petzval curvature has a positive sign.

Here, when the Petzval curvature has the positive sign, the field curvature aberration in which the optical image surface is convex toward the object side occurs, and thus the exit pupil position of the lens optical unit inevitably has the positive sign. As a result, it is difficult to reduce the size of the lens optical unit and increase the image quality thereof.

Thus, when the lens optical unit satisfies the conditional expression (2), the size can be reduced, and the image quality can be increased.

In the lens optical unit according to an embodiment of the present technology, the non-planar shape of the imaging plane in the solid-state image sensor is preferably the curved surface shape that is rotationally symmetric about the optical axis.

Since the non-planar shape of the imaging plane in the solid-state image sensor has the curved surface shape that is rotationally symmetric about the optical axis, a lens surface shape of each of lenses configuring the lens optical unit is formed in the shape having rotational symmetry, and thus an optical design and the manufacture of the lens can be simplified.

In the lens optical unit according to an embodiment of the present technology, it is preferred that an angle at which a main light ray having a maximum angle of field is incident on the imaging plane in a state of shooting at infinity in an entire zoom area satisfy the following conditional expression (3).

$$\theta_{max} < 45° \quad (3)$$

$\theta_{max}$: angle at which a main light ray having a maximum angle of field is incident on an imaging plane (vertical incidence is set to 0°).

The conditional expression (3) is a formula specifying an angle at which a main light ray having a maximum angle of field is incident on an imaging plane.

When the angle is too large and exceeds the conditional expression (3), an angle of a light ray incident on the solid-state image sensor is too inclined in an oblique direction, and thus, particularly, a quantity of light around the screen edge part is remarkably reduced. Further, an on-chip lens arranged on the solid-state image sensor does not sufficiently function, and incident light enters neighboring diode elements between pixels as stray light. Thus, particularly, a mixed color is generated in an imaging element that can output a color image, and thus the image quality degrades.

However, it is preferred that the lens optical unit according to an embodiment be configured to satisfy the following conditional expression (3)'.

$$5° < \theta_{max} < 35° \quad (3)'$$

When the lens optical unit satisfies the conditional expression (3)', the above-described advantages can be further obtained.

Further, it is preferred that the lens optical unit according to an embodiment be configured to satisfy the following conditional expression (3)".

$$"7.5° < \theta_{max} < 25° \quad (3)"$$

When the lens optical unit satisfies the conditional expression (3)", the above-described advantages can be further obtained to a maximum.

In the lens optical unit according to an embodiment of the present technology, it is preferred that the entire imaging plane of the solid-state image sensor have a spherical shape with the same curvature.

When the entire imaging plane of the solid-state image sensor is formed in the spherical shape with the same curvature, it is possible to simply measure and manage the shape of the imaging plane when the solid-state image sensor whose imaging plane has the non-planar shape is manufactured or mass-produced and then managed.

In the lens optical unit according to an embodiment of the present technology, it is preferred that the imaging plane of the solid-state image sensor and the focal length of the optical unit satisfy the following conditional expression (4).

$$-5.0 < R_{img}/f_{inf} < -1.0 \quad (4)$$

$R_{img}$: curvature radius of an imaging plane of a solid-state image sensor $f_{inf}$: focal length of an optical unit at the time of focusing at infinity The conditional expression (4) is an equation specifying the ratio between the curvature radius of the imaging plane of the solid-state image sensor and the focal length of the entire system of the lens optical unit.

Here, when the ratio is too large and exceeds the upper limit of the conditional expression (4), the curvature of the imaging plane of the solid-state image sensor is too strong with respect to the focal length of the lens optical unit, and thus the imaging plane is designed to be curved more than necessary for the field curvature aberration. As a result, the thickness of a lens barrel, particularly, in the optical axis direction, is significantly increased.

However, when the ratio is too small and falls below the lower limit of the conditional expression (4), the curvature of the imaging plane of the solid-state image sensor is too loose with respect to the focal length of the lens optical unit, and thus it is necessary to correct the field curvature aberration at the lens optical unit side.

It is preferred that the lens optical unit according to an embodiment be configured to satisfy the following conditional expression (4)'.

$$'-4.75 < R_{img}/f_{inf} < -1.5 \quad (4)'$$

When the lens optical unit satisfies the conditional expression (4)', the above-described advantages can be obtained to a maximum.

In the lens optical unit according to an embodiment of the present technology, it is preferred to arrange a total of four lenses including two positive lenses and two negative lenses.

By arranging a total of four lenses including two positive lenses and two negative lenses, the number of lenses configuring the lens optical unit can be reduced to a necessary minimum number, and then various kinds of aberration correction can be appropriately performed, and high resolution can be secured.

In the lens optical unit according to an embodiment of the present technology, it is preferred that a lens closest to the image side be a concave meniscus lens having a shape which is convex toward the image side.

By using the concave meniscus lens having the shape which is convex toward the image side as the lens closest to the image side, magnification by the lens closest to the image side can be increased, the size of the entire optical unit can be reduced, and the occurrence of astigmatism by the lens surface closest to the image side can be suppressed.

In the lens optical unit according to an embodiment of the present technology, it is preferred to form an aspheric surface on the lens surface closest to the image side.

By the aspheric surface on the lens surface closest to the image side, the astigmatism of the optical unit can be appropriately corrected, and thus the image quality can be improved.

The lens optical unit can perform focusing by moving the whole or a part of the optical unit in the optical axis direction, and can perform camera-shake correction by shifting the whole or a part of the optical unit in a direction vertical to the optical axis.

Further, it is effective to modulate the non-planar shape of the imaging plane of the solid-state image sensor illustrated in the above-described embodiment according focusing or zooming of the lens optical unit. Thus, this embodiment is also included in the technical scope of the present technology.

[Numerical Value Example of Lens Optical Unit]

Next, concrete embodiments of the lens optical unit according to the present technology, and numerical examples in which a concrete numerical value is applied to an embodiment will be described with reference to the accompanying drawings and tables.

Here, symbols and the like used in tables or a description have the following meanings.

"si" represents a surface number of an $i^{th}$ surface counted from the object side to the image side, "ri" represents a paraxial curvature radius of the $i^{th}$ surface, "di" represents an on-axis surface interval (the thickness of the center of a lens or an air gap) between the $i^{th}$ surface and the $(i+1)^{th}$ surface, "ni" represents a refractive index in a d line ($\lambda$=587.6 nm) of a lens starting from the $i^{th}$ surface or the like, and "vi" represents an Abbe number in a d line of a lens starting from the $i^{th}$ surface or the like.

Each "ASP" related to "si" represents that a corresponding surface is an aspherical surface, "STO" represents that a corresponding surface is an aperture stop, "IMG" represents that a corresponding surface is an imaging plane of a solid-state image sensor, and "INFINITY" related to "ri" represents that a corresponding surface is a plane.

"f" represents a focal length, "Fno" represents an F number, and "ω" represents a half angle of field.

"κ" represents a conic constant, and "A," "B," "C," and "D" represent a $4^{th}$ order aspherical coefficient, a $6^{th}$ order aspherical coefficient, an $8^{th}$ order aspherical coefficient, and a $10^{th}$ order aspherical coefficient, respectively.

In each table representing an aspherical coefficient, "E-n" represents a base 10 exponential expression, that is, "$10^{-n}$." For example, "0.12345E-05" represents "$0.12345 \times 10^{-5}$."

In the lens optical unit used in each embodiment, the lens surface is formed on the aspheric surface. The aspherical shape is defined by the following Formula 1 when "x" is a distance (sag amount) from a vertex of a lens surface in an optical axis direction, "y" is the height (image height) in a direction vertical to the optical axis direction, "c" is a paraxial curvature (a reciprocal of a curvature radius) at the vertex of a lens, "κ" is a conic constant, and "A," "B," "C," and "D" represent a $4^{th}$ order aspherical coefficient, a $6^{th}$ order aspherical coefficient, an $8^{th}$ order aspherical coefficient, and a $10^{th}$ order aspherical coefficient, respectively.

$$x = \frac{cy^2}{1+[1-(1+k)c^2y^2]^{1/2}} + Ay^4 + By^6 + \ldots \quad \text{[Formula 1]}$$

<First Embodiment>

Figure 3:
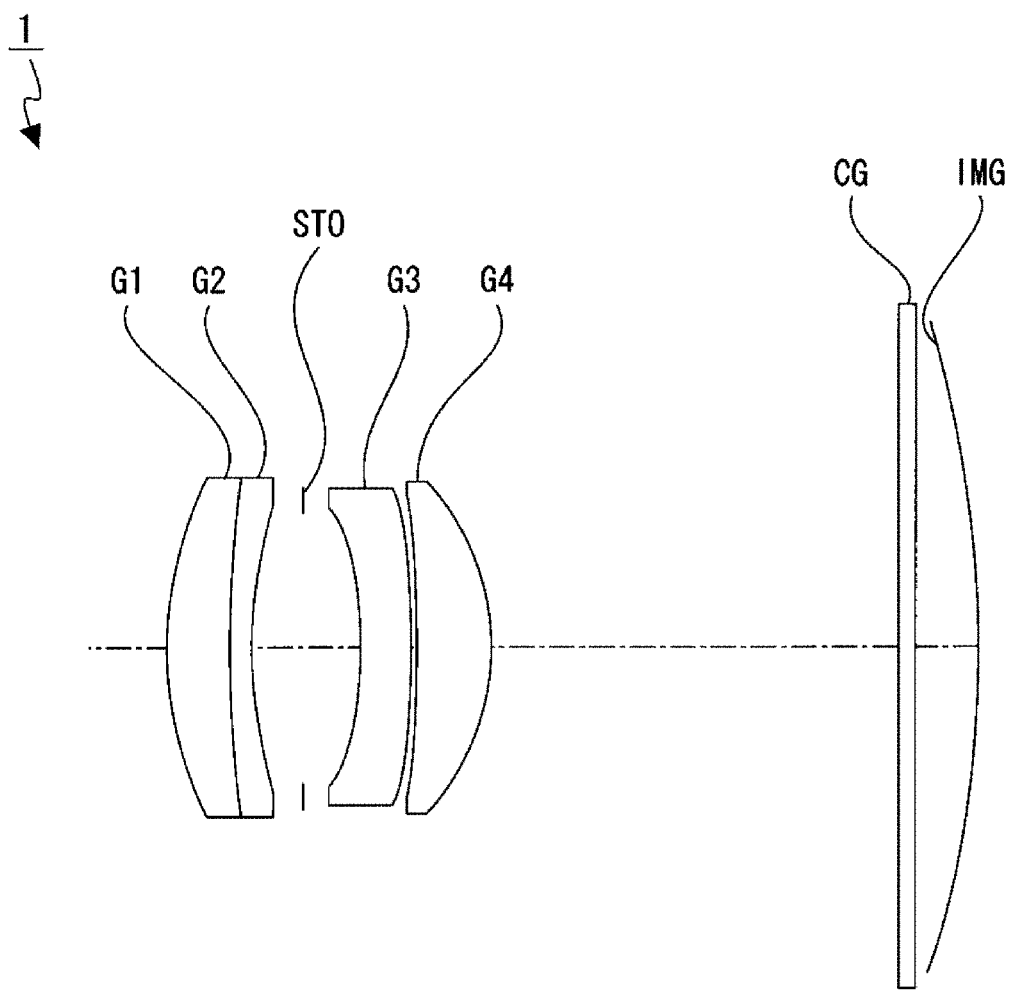
FIG. 3 is a diagram illustrating a lens configuration of a lens optical unit according to a first embodiment.

FIG. 3 illustrates a lens configuration of a lens optical unit 1 according to a first embodiment of the present technology.

The lens optical unit 1 includes a first positive lens G1, a first negative lens G2, a second negative lens G3, and a second positive lens G4, which are arranged in order from the object side to the image side.

The first positive lens G1 is formed in a meniscus form convex to the object side, the first negative lens G2 is formed in a meniscus form convex to the object side, and a cemented lens is configured by the first positive lens G1 and the first negative lens G2.

The second negative lens G3 is formed in a cemented lens concave to the object side.

The second positive lens G4 is formed in a cemented lens concave to the object side.

An aperture stop STO is arranged between the first negative lens G2 and the second negative lens G3.

A cover glass CG is arranged at the object side of the imaging plane IMG near the imaging plane IMG.

The imaging plane IMG is formed in a non-planar shape concave to the object side, for example, a curved surface shape concave to the object side.

Table 1 represents lens data of a first numerical example in which a concrete numerical value is applied to the lens optical unit 1 according to the first embodiment.

TABLE 1

| si | ri | di | ni | vi |
|---|---|---|---|---|
| 1 (ASP) | 24.762 | 3.860 | 1.88202 | 37.221 |
| 2 | 84.898 | 1.464 | 1.84666 | 23.780 |
| 3 | 32.429 | 3.200 | | |
| STO | INFINITY | 3.600 | | |
| 5 (ASP) | −46.876 | 3.250 | 1.82115 | 24.058 |
| 6 (ASP) | −800.000 | 0.300 | | |
| 7 (ASP) | −124.049 | 4.756 | 1.59201 | 67.023 |
| 8 (ASP) | −14.961 | 25.757 | | |
| 9 | INFINITY | 1.000 | 1.51680 | 64.200 |
| 10 | INFINITY | 4.000 | | |
| IMG | −70.000 | | | |

Table 2 represents the focal length f, the F number Fno, and the half angle of field ω in the first numerical example.

TABLE 2

| f | 36.20 |
|---|---|
| Fno | 1.86 |
| ω | 31.75 |

In the lens optical unit 1, an object side surface (a first surface) of the first positive lens G1, both surfaces (a fifth surface and a sixth surface) of the second negative lens G3, and both surfaces (a seventh surface and an eighth surface) of the second positive lens G4 are formed in the aspheric surface. Table 3 represents the conic constant κ together with the $4^{th}$ order, $6^{th}$ order, $8^{th}$ order, and $10^{th}$ order aspherical coefficients A, B, C, and D of the aspheric surface in the first numerical example.

TABLE 3

| si | κ | A | B | C | D |
|---|---|---|---|---|---|
| 1 | 0.00000E+00 | 2.94653E−06 | 7.27109E−10 | 2.06435E−10 | 0.00000E+00 |
| 5 | 0.00000E+00 | −1.81306E−04 | −1.92452E−07 | −1.79868E−09 | 0.00000E+00 |
| 6 | 0.00000E+00 | −1.58428E−04 | 6.15336E−07 | −1.86090E−09 | 0.00000E+00 |
| 7 | 0.00000E+00 | −6.83309E−05 | 7.28888E−07 | −2.88958E−09 | 0.00000E+00 |
| 8 | 0.00000E+00 | −4.40698E−07 | 1.21284E−07 | 2.62575E−10 | 0.00000E+00 |

Figure 4:
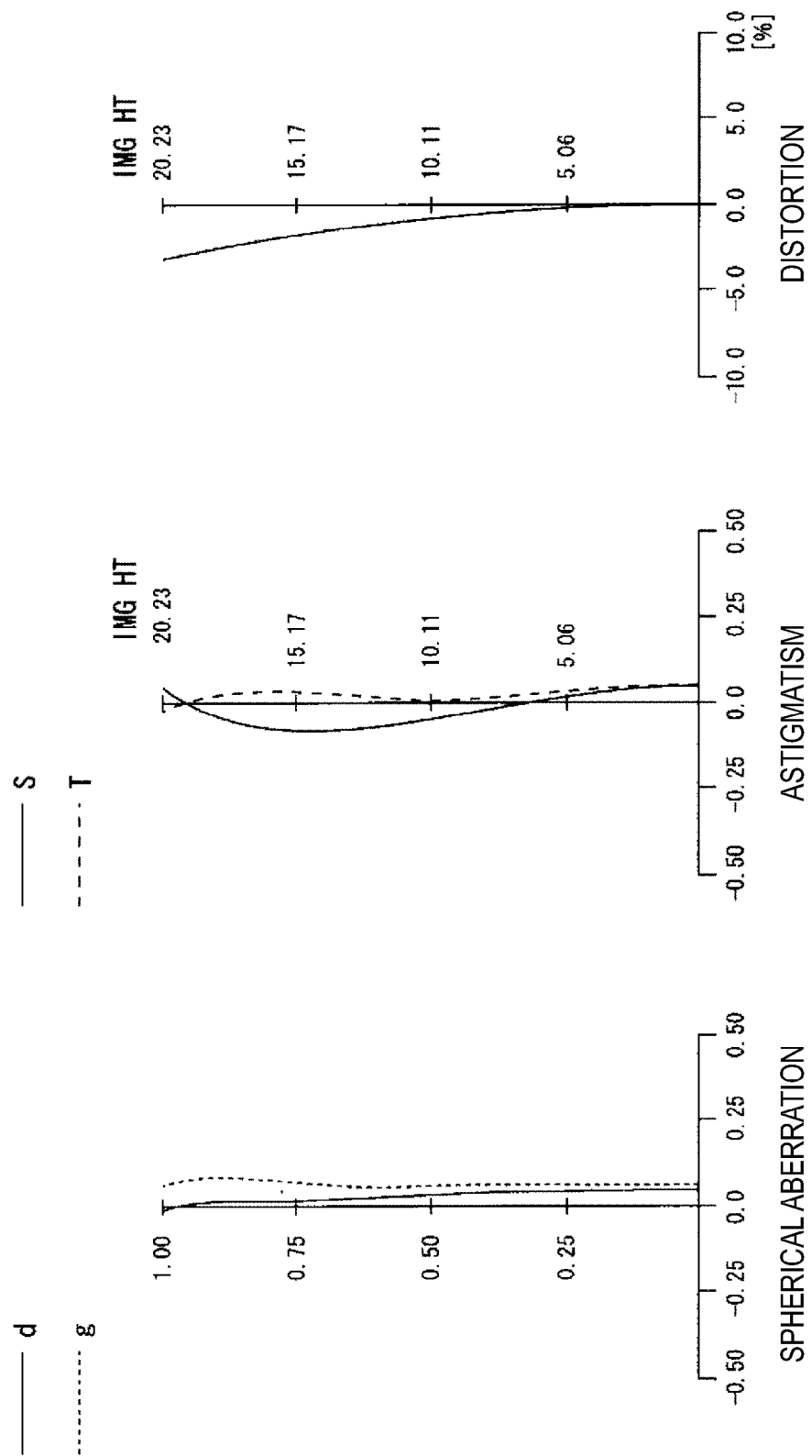
FIG. 4 is a diagram illustrating spherical aberration, astigmatism, and distortion of a numerical example in which a concrete numerical value is applied to the first embodiment.

FIG. 4 illustrates various aberration diagrams in a state of shooting at infinity in the first numerical example. In FIG. 4, in a spherical aberration diagram, a solid line represents a value on a d line (a wavelength of 587.6 nm), and a dotted line represents a value on a g line (a wavelength of 435.8 nm). Further, in an astigmatism diagram, a solid line represents a value on a sagittal image plane, and a dotted line represents a value on a meridional image plane.

It can be understood from the respective aberration diagrams that in the first numerical example, various aberrations are successfully corrected, and thus excellent imaging performance is obtained.

<Second Embodiment>

Figure 5:
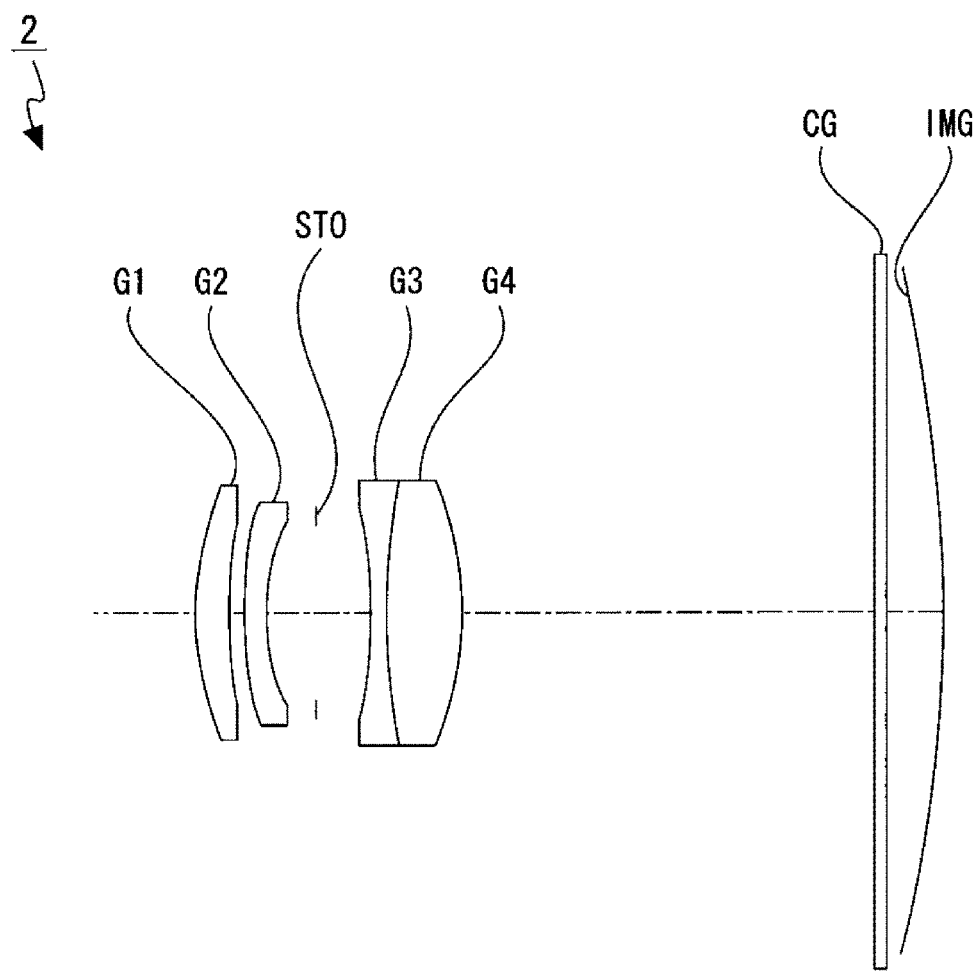
FIG. 5 is a diagram illustrating a lens configuration of a lens optical unit according to a second embodiment.

FIG. 5 illustrates a lens configuration of a lens optical unit 2 according to a second embodiment of the present technology.

The lens optical unit 2 includes a first positive lens G1, a first negative lens G2, a second negative lens G3, and a second positive lens G4, which are arranged in order from the object side to the image side.

The first positive lens G1 is formed in a meniscus form convex to the object side.

The first negative lens G2 is formed in a meniscus form convex to the object side.

The second negative lens G3 is formed in a biconcave shape, the second positive lens G4 is formed in a biconvex shape, and a cemented lens is configured by the second negative lens G3 and the second positive lens G4.

An aperture stop STO is arranged between the first negative lens G2 and the second negative lens G3.

A cover glass CG is arranged at the object side of the imaging plane IMG near the imaging plane IMG.

The imaging plane IMG is formed in a non-planar shape concave to the object side, for example, a curved surface shape concave to the object side.

Table 4 represents lens data of a second numerical example in which a concrete numerical value is applied to the lens optical unit 2 according to the second embodiment.

TABLE 4

| si | ri | di | ni | vi |
|---|---|---|---|---|
| 1 (ASP) | 17.001 | 2.302 | 1.72903 | 54.041 |
| 2 (ASP) | 37.526 | 0.860 | | |
| 3 (ASP) | 41.071 | 1.500 | 1.68893 | 31.161 |
| 4 (ASP) | 21.996 | 3.000 | | |
| STO | INFINITY | 3.500 | | |
| 6 | −31.783 | 1.000 | 1.75211 | 25.048 |
| 7 | −51.595 | 4.800 | 1.85135 | 40.100 |
| 8 (ASP) | −21.470 | 26.000 | | |
| 9 | INFINITY | 0.800 | 1.51680 | 64.200 |
| 10 | INFINITY | 3.500 | | |
| IMG | −100.000 | | | |

Table 5 represents the focal length f, the F number Fno, and the half angle of field ω in the second numerical example.

TABLE 5

| f | 36.45 |
|---|---|
| Fno | 2.85 |
| ω | 32.76 |

In the lens optical unit 2, both surfaces (a first surface and a second surface) of the first positive lens G1, both surfaces (a third surface and a fourth surface) of the first negative lens G2, and an image side surface (an eighth surface) of the second positive lens G4 are formed in the aspheric surface. Table 6 represents the conic constant κ together with the $4^{th}$ order, $6^{th}$ order, $8^{th}$ order, and $10^{th}$ order aspherical coefficients A, B, C, and D of the aspheric surface in the second numerical example.

TABLE 6

| si | κ | A | B | C | D |
|---|---|---|---|---|---|
| 1 | 0.00000E+00 | −6.30497E−05 | −6.72635E−07 | −2.13264E−09 | 0.00000E+00 |
| 2 | 0.00000E+00 | −5.11124E−05 | −1.22401E−06 | 5.27413E−09 | 0.00000E+00 |
| 3 | 0.00000E+00 | 3.23238E−04 | −3.12676E−06 | 8.16335E−09 | 0.00000E+00 |
| 4 | 0.00000E+00 | 3.80955E−04 | −2.00733E−06 | −1.00396E−08 | 0.00000E+00 |
| 8 | −2.14698E+01 | 0.00000E+00 | −7.75288E−07 | −4.85265E−08 | 6.04532E−10 |

Figure 6:
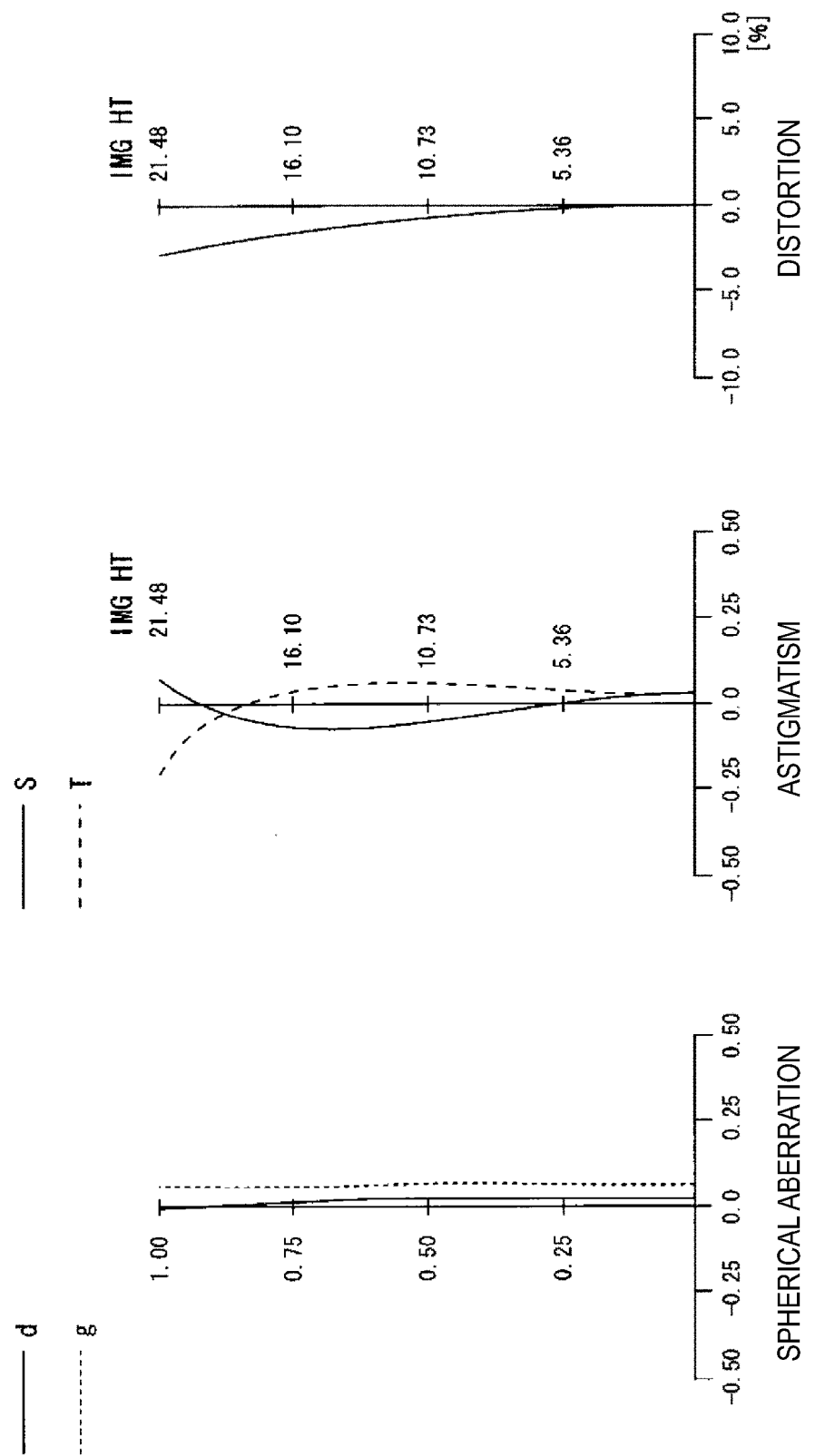
FIG. 6 is a diagram illustrating spherical aberration, astigmatism, and distortion of a numerical example in which a concrete numerical value is applied to the second embodiment.

FIG. 6 illustrates various aberration diagrams in a state of shooting at infinity in the second numerical example. In FIG. 6, in a spherical aberration diagram, a solid line represents a value on a d line (a wavelength of 587.6 nm), and a dotted line represents a value on a g line (a wavelength of 435.8 nm). Further, in an astigmatism diagram, a solid line represents a value on a sagittal image plane, and a dotted line represents a value on a meridional image plane.

It can be understood from the respective aberration diagrams that in the second numerical example, various aberrations are successfully corrected, and thus excellent imaging performance is obtained.

<Third Embodiment>

Figure 7:
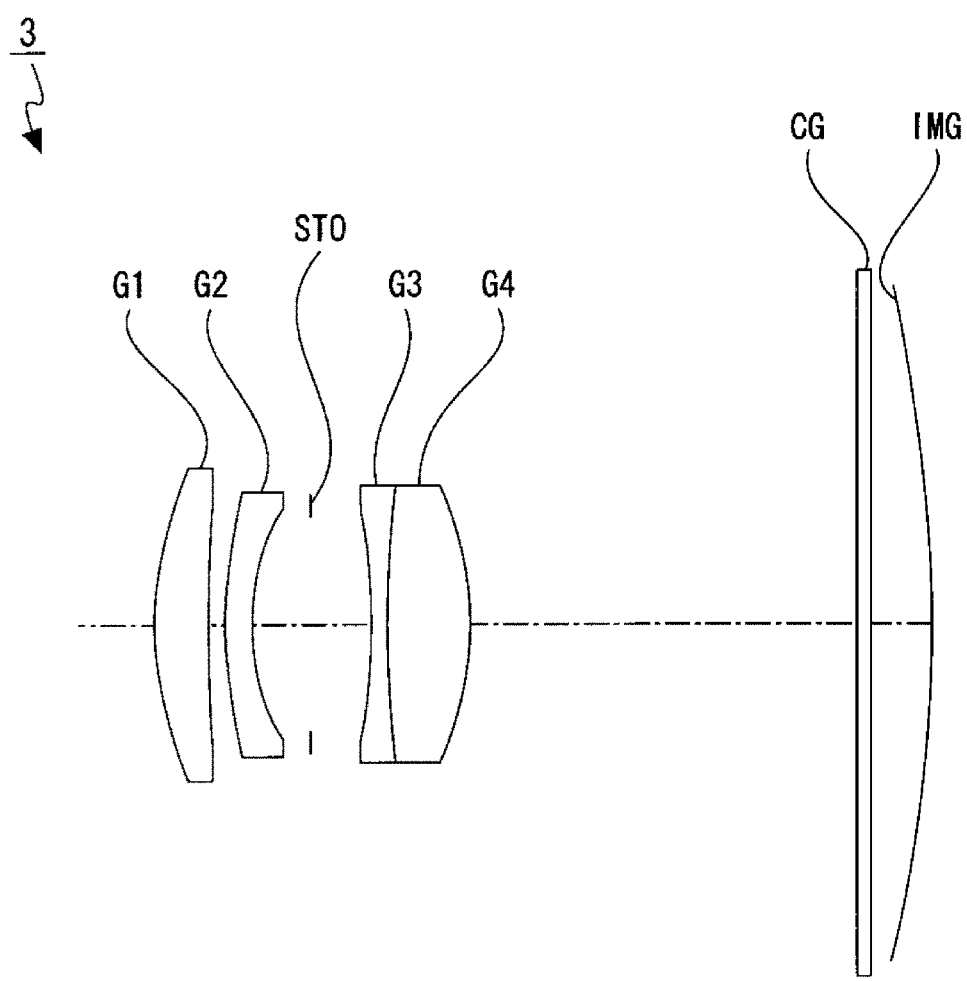
FIG. 7 is a diagram illustrating a lens configuration of a lens optical unit according to a third embodiment.

FIG. 7 illustrates a lens configuration of a lens optical unit 3 according to a third embodiment of the present technology.

The lens optical unit 3 includes a first positive lens G1, a first negative lens G2, a second negative lens G3, and a second positive lens G4, which are arranged in order from the object side to the image side.

The first positive lens G1 is formed in a meniscus form convex to the object side.

The first negative lens G2 is formed in a meniscus form convex to the object side.

The second negative lens G3 is formed in a biconcave shape, the second positive lens G4 is formed in a biconvex shape, and a cemented lens is configured by the second negative lens G3 and the second positive lens G4.

An aperture stop STO is arranged between the first negative lens G2 and the second negative lens G3.

A cover glass CG is arranged at the object side of the imaging plane IMG near the imaging plane IMG.

The imaging plane IMG is formed in a non-planar shape concave to the object side, for example, a curved surface shape concave to the object side.

Table 7 represents lens data of a third numerical example in which a concrete numerical value is applied to the lens optical unit 3 according to the third embodiment.

TABLE 7

| si | ri | di | ni | vi |
|---|---|---|---|---|
| 1 (ASP) | 17.844 | 3.500 | 1.72903 | 54.041 |
| 2 (ASP) | 76.246 | 0.850 | | |
| 3 (ASP) | 61.880 | 1.850 | 1.68893 | 31.161 |
| 4 (ASP) | 19.396 | 3.600 | | |
| STO | INFINITY | 3.600 | | |
| 6 | −59.316 | 1.200 | 1.75211 | 25.048 |
| 7 | 113.280 | 4.850 | 1.77250 | 49.467 |
| 8 (ASP) | −23.018 | 22.710 | | |
| 9 | INFINITY | 0.800 | 1.51680 | 64.200 |
| 10 | INFINITY | 3.800 | | |
| IMG | −85.000 | | | |

Table 8 represents the focal length f, the F number Fno, and the half angle of field ω in third numerical example.

TABLE 8

| f | 36.11 |
|---|---|
| Fno | 2.26 |
| ω | 31.64 |

In the lens optical unit 3, both surfaces (a first surface and a second surface) of the first positive lens G1, both surfaces (a third surface and a fourth surface) of the first negative lens G2, and an image side surface (an eighth surface) of the second positive lens G4 are formed in the aspheric surface. Table 9 represents the conic constant x together with the $4^{th}$ order, $6^{th}$ order, $8^{th}$ order, and $10^{th}$ order aspherical coefficients A, B, C, and D of the aspheric surface in the third numerical example.

TABLE 9

| si | κ | A | B | C | D |
|---|---|---|---|---|---|
| 1 | 0.00000E+00 | −2.53793E−05 | −2.32407E−07 | 3.48950E−10 | 0.00000E+00 |
| 2 | 0.00000E+00 | −1.72633E−05 | −6.73790E−08 | 1.11212E−10 | 0.00000E+00 |
| 3 | 0.00000E+00 | 1.82811E−04 | −1.42255E−06 | 2.58381E−09 | 0.00000E+00 |
| 4 | 0.00000E+00 | 2.40327E−04 | −1.25399E−06 | −3.03090E−09 | 0.00000E+00 |
| 8 | 0.00000E+00 | −3.45052E−06 | −8.33716E−08 | 8.30287E−10 | −6.34646E−12 |

Figure 8:
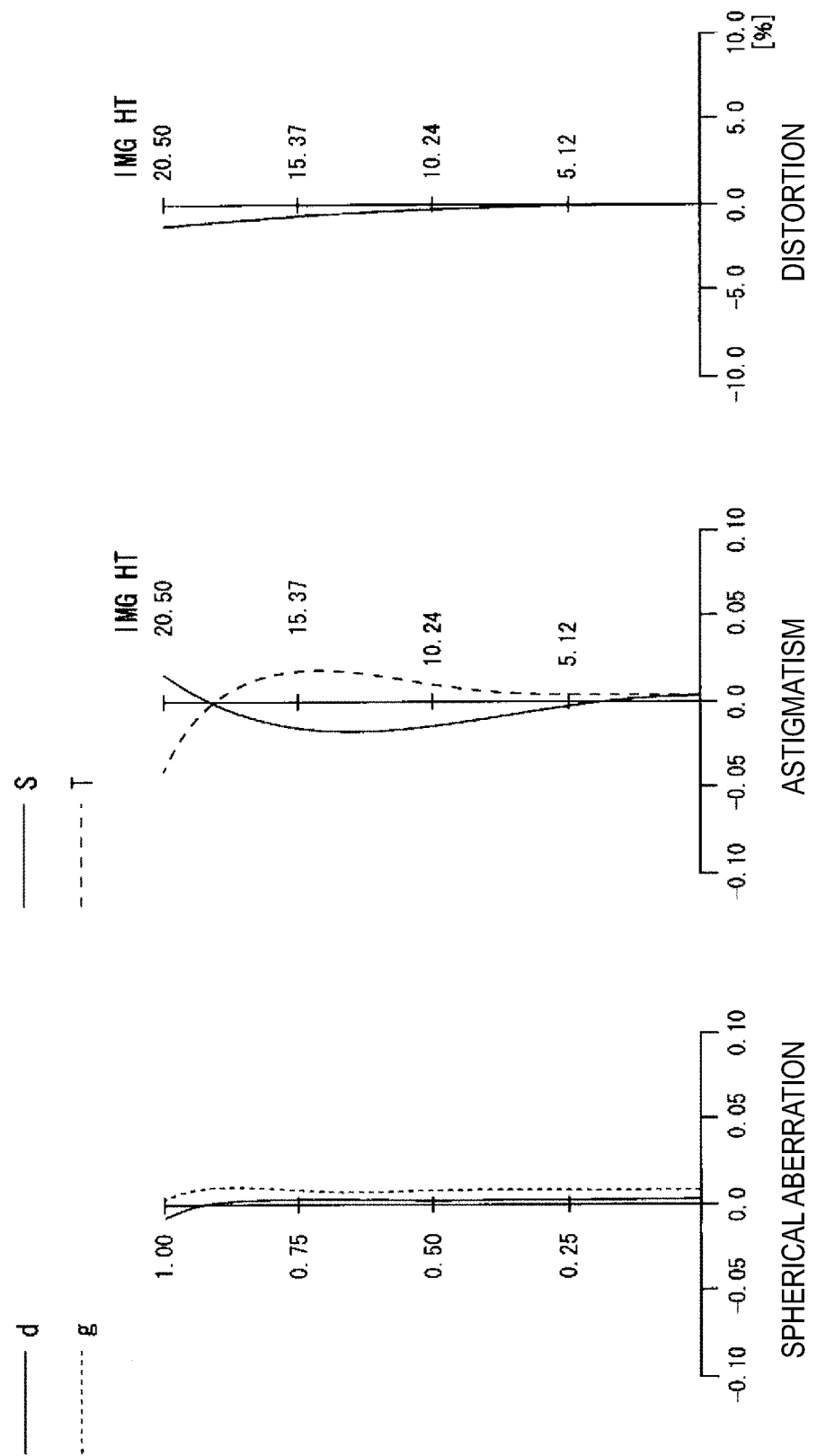
FIG. 8 is a diagram illustrating spherical aberration, astigmatism, and distortion of a numerical example in which a concrete numerical value is applied to the third embodiment.

FIG. 8 illustrates various aberration diagrams in a state of shooting at infinity in the third numerical example. In FIG. 8, in a spherical aberration diagram, a solid line represents a value on a d line (a wavelength of 587.6 nm), and a dotted line represents a value on a g line (a wavelength of 435.8 nm). Further, in an astigmatism diagram, a solid line represents a value on a sagittal image plane, and a dotted line represents a value on a meridional image plane.

It can be understood from the respective aberration diagrams that in the third numerical example, various aberrations are successfully corrected, and thus excellent imaging performance is obtained.

<Fourth Embodiment>

Figure 9:
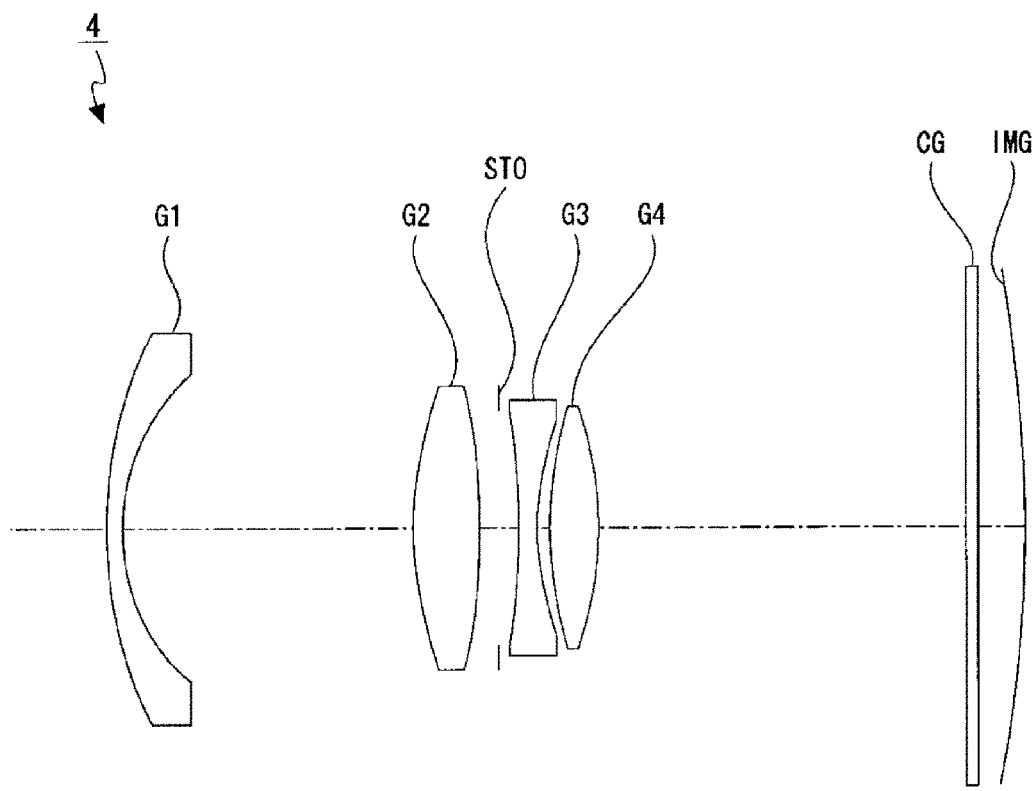
FIG. 9 is a diagram illustrating a lens configuration of a lens optical unit according to a fourth embodiment.

FIG. 9 illustrates a lens configuration of a lens optical unit 4 according to a fourth embodiment of the present technology.

The lens optical unit 4 includes a first negative lens G1, a first positive lens G2, a second negative lens G3, and a second positive lens G4, which are arranged in order from the object side to the image side.

The first negative lens G1 is formed in a meniscus form convex to the object side.

The first positive lens G2 is formed in a biconvex shape.

The second negative lens G3 is formed in a biconcave shape.

The second positive lens G4 is formed in a biconvex shape.

An aperture stop STO is arranged between the first positive lens G2 and the second negative lens G3.

A cover glass CG is arranged at the object side of the imaging plane IMG near the imaging plane IMG.

The imaging plane IMG is formed in a non-planar shape concave to the object side, for example, a curved surface shape concave to the object side.

Table 10 represents lens data of a fourth numerical example in which a concrete numerical value is applied to the lens optical unit 4 according to the fourth embodiment.

TABLE 10

| si | ri | di | ni | vi |
|---|---|---|---|---|
| 1 (ASP) | 41.184 | 1.400 | 1.55332 | 71.685 |
| 2 (ASP) | 19.370 | 23.305 | | |
| 3 (ASP) | 30.751 | 5.350 | 1.80139 | 45.450 |
| 4 (ASP) | −59.549 | 1.690 | | |
| STO | INFINITY | 1.500 | | |
| 6 | −59.896 | 1.400 | 1.74077 | 27.761 |
| 7 | 24.158 | 1.029 | | |
| 8 | 35.787 | 3.971 | 1.61881 | 63.855 |
| 9 (ASP) | −27.363 | 29.486 | | |
| 10 | INFINITY | 1.000 | 1.51680 | 64.200 |
| 11 | INFINITY | 3.700 | | |
| IMG | −120.000 | | | |

Table 11 represents the focal length f, the F number Fno and the half angle of field ω in the fourth numerical example.

TABLE 11

| f | 29.96 |
|---|---|
| Fno | 2.06 |
| ω | 37.44 |

In the lens optical unit 4, both surfaces (a first surface and a second surface) of the first negative lens G1, both surfaces (a third surface and a fourth surface) of the first positive lens G2, and an image side surface (a ninth surface) of the second positive lens G4 are formed in the aspheric surface. Table 12 represents the conic constant κ together with the $4^{th}$ order, $6^{th}$ order, $8^{th}$ order, and $10^{th}$ order aspherical coefficients A, B, C, and D of the aspheric surface in the fourth numerical example.

TABLE 12

| si | κ | A | B | C | D |
|---|---|---|---|---|---|
| 1 | 0.00000E+00 | 3.20152E−05 | −1.53053E−07 | 4.06156E−10 | −5.19630E−13 |
| 2 | 0.00000E+00 | 4.66676E−05 | −4.34099E−08 | −6.64566E−11 | 2.56394E−12 |
| 3 | 0.00000E+00 | −5.13762E−06 | −1.09407E−08 | −7.46311E−11 | 0.00000E+00 |
| 4 | 0.00000E+00 | −5.35092E−06 | −1.06800E−08 | −1.87505E−11 | 0.00000E+00 |
| 9 | 0.00000E+00 | 1.29402E−05 | 1.03050E−08 | −1.44274E−10 | 0.00000E+00 |

Figure 10:
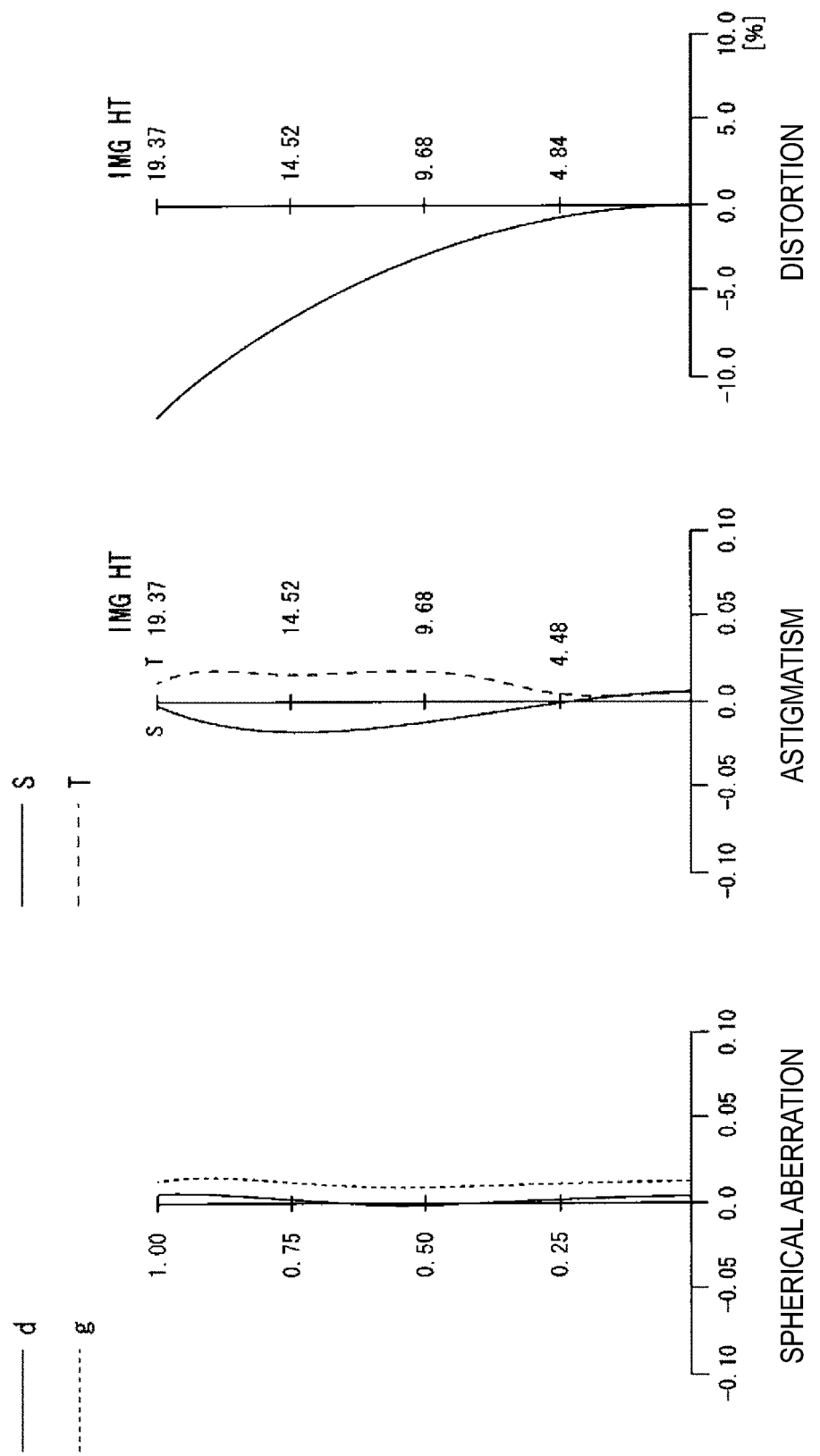
FIG. 10 is a diagram illustrating spherical aberration, astigmatism, and distortion of a numerical example in which a concrete numerical value is applied to the fourth embodiment.

FIG. 10 illustrates various aberration diagrams in a state of shooting at infinity in the fourth numerical example. In FIG. 10, in a spherical aberration diagram, a solid line represents a value on a d line (a wavelength of 587.6 nm), and a dotted line represents a value on a g line (a wavelength of 435.8 nm). Further, in an astigmatism diagram, a solid line represents a value on a sagittal image plane, and a dotted line represents a value on a meridional image plane.

It can be understood from the respective aberration diagrams that in the fourth numerical example, various aberrations are successfully corrected, and thus excellent imaging performance is obtained.

<Fifth Embodiment>

Figure 11:
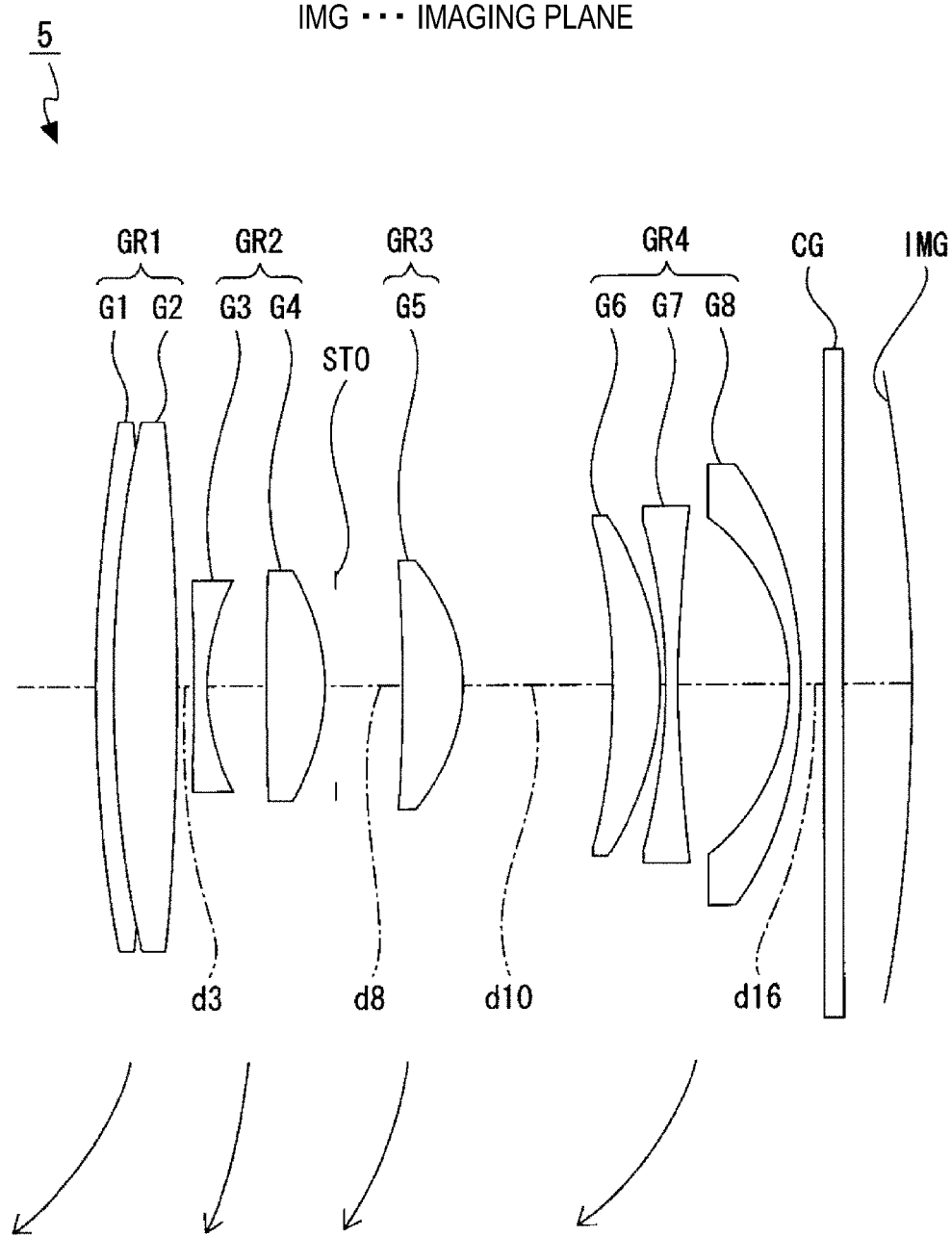
FIG. 11 is a diagram illustrating a lens configuration of a lens optical unit according to a fifth embodiment.

FIG. 11 illustrates a lens configuration of a lens optical unit 5 according to a fifth embodiment of the present technology.

The lens optical unit 5 includes a first lens group GR1, a second lens group GR2, a third lens group GR3, and a fourth lens group GR4, which are arranged in order from the object side to the image side.

Here, zoom magnification of the lens optical unit 5 is set to 2.3 times.

The first lens group GR1 is configured such that a negative lens G1 of a meniscus form convex to the object side and a positive lens G2 of a biconvex shape are arranged in order from the object side to the image side, and a cemented lens is configured by the negative lens G1 and the positive lens G2.

The second lens group GR2 is configured such that a negative lens G3 of a biconcave shape and a positive lens G4 of a biconvex shape are arranged in order from the object side to the image side.

The third lens group GR3 is configured with a positive lens G5 of a meniscus form convex to the image side.

The fourth lens group GR4 is configured such that a positive lens G6 of a meniscus form concave to the object side, a negative lens G7 of a biconcave shape, and a negative lens G8 of a meniscus form concave to the object side are arranged in order from the object side to the image side.

An aperture stop STO is arranged between the second lens group GR2 and the third lens group GR3.

A cover glass CG is arranged between the fourth lens group GR4 and the imaging plane IMG.

The imaging plane IMG is formed in a non-planar shape concave to the object side, for example, a curved surface shape concave to the object side.

Table 13 represents lens data of a fifth numerical example in which a concrete numerical value is applied to the lens optical unit 5 according to the fifth embodiment.

TABLE 13

| si | ri | di | ni | vi |
|---|---|---|---|---|
| 1 | 38.585 | 0.400 | 1.92286 | 20.880 |
| 2 | 31.704 | 1.609 | 1.49700 | 81.608 |
| 3 | −63.089 | (d3) | | |
| 4 (ASP) | −602.321 | 0.300 | 1.72903 | 54.041 |
| 5 (ASP) | 6.155 | 1.509 | | |
| 6 | 81.600 | 1.400 | 1.48749 | 70.441 |
| 7 | −5.827 | 0.300 | | |
| STO | INFINITY | (d8) | | |
| 9 (ASP) | −64.103 | 1.500 | 1.49710 | 81.560 |
| 10 (ASP) | −4.423 | (d10) | | |
| 11 | −16.931 | 1.143 | 1.49700 | 81.608 |
| 12 | −7.590 | 0.150 | | |
| 13 | −17.008 | 0.300 | 1.88100 | 40.139 |
| 14 | 29.702 | 2.796 | | |
| 15 (ASP) | −5.982 | 0.300 | 1.61881 | 63.855 |
| 16 (ASP) | −12.500 | (d16) | | |
| 17 | INFINITY | 0.500 | 1.51680 | 64.200 |
| 18 | INFINITY | 1.700 | | |
| IMG | −50.000 | | | |

In the lens optical unit 5, when magnification between a wide angle end state and a telephoto end state changes, a surface interval d3 between the first lens group GR1 and the second lens group GR2, a surface interval d8 between the aperture stop STO and the third lens group GR3, a surface interval d10 between the third lens group GR3 and the fourth lens group GR4, and a surface interval d16 between the fourth lens group GR4 and the cover glass CG change. Table 14 represents the focal length f, the F number Fno, and the half angle of field ω together with variable intervals in a wide angle end state, an intermediate focal length state, and a telephoto end state of each surface interval in the fifth numerical example.

TABLE 14

|  | Wide angle end | Intermediate focal length | Telephoto end |
|---|---|---|---|
| f | 10.79 | 6.30 | 24.66 |
| Fno | 2.86 | 4.01 | 5.45 |
| ω | 37.80 | 26.27 | 17.84 |
| (d3) | 0.450 | 4.105 | 8.874 |
| (d8) | 1.655 | 1.471 | 1.301 |
| (d10) | 3.782 | 1.815 | 0.449 |
| (d16) | 0.500 | 6.163 | 13.365 |

In the lens optical unit 5, both surfaces (a fourth surface and a fifth surface) of the negative lens G3 of the second lens group GR2, both surfaces (a ninth surface and a tenth surface) of the positive lens G5 of the third lens group GR3, both surfaces (a fifteenth surface and a sixteenth surface) of the negative lens G8 of the fourth lens group GR4 are formed in the aspheric surface. Table 15 represents the conic constant κ together with the $4^{th}$ order, $6^{th}$ order, $8^{th}$ order, and $10^{th}$ order aspherical coefficients A, B, C, and D of the aspheric surface in the fifth numerical example.

TABLE 15

| si | κ | A | B | C | D |
|---|---|---|---|---|---|
| 4 | 0.00000E+00 | −1.46170E−03 | 1.45761E−05 | −1.82402E−08 | 0.00000E+00 |
| 5 | 0.00000E+00 | 1.13942E−03 | 9.18269E−05 | 3.19685E−06 | 0.00000E+00 |
| 9 | 0.00000E+00 | −1.12787E−04 | −2.90212E−05 | 2.67967E−06 | 0.00000E+00 |
| 10 | 0.00000E+00 | 9.14482E−04 | −1.66455E−05 | 4.06889E−06 | 0.00000E+00 |
| 15 | 0.00000E+00 | −6.24824E−04 | −2.83131E−05 | 3.01294E−06 | −1.41809E−07 |
| 16 | −6.19521E−01 | −8.01398E−04 | 2.15819E−05 | −3.34605E−07 | 0.00000E+00 |

Figure 12:
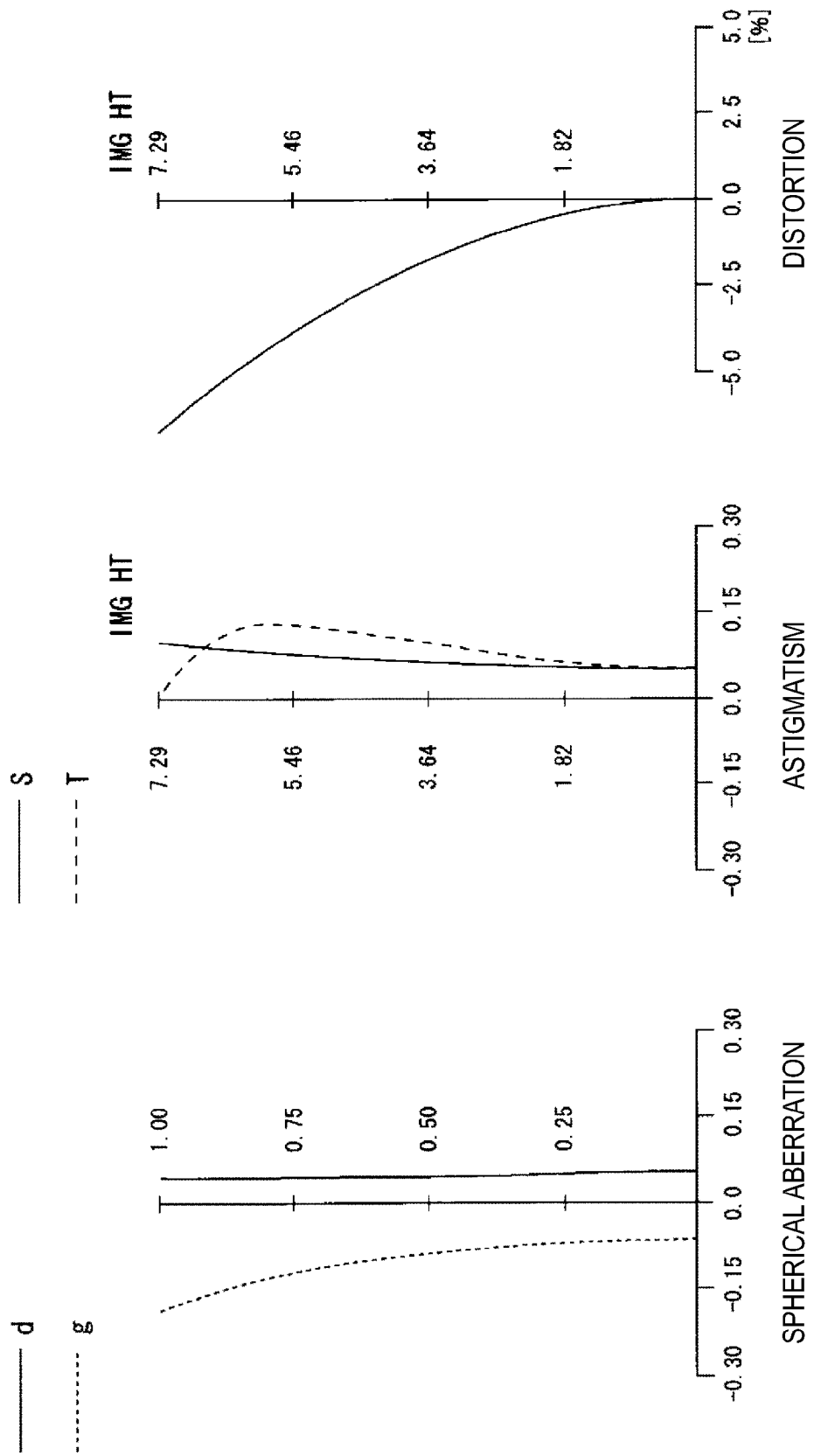
FIG. 12 illustrates aberration diagrams of a numerical example in which a concrete numerical value is applied to the fifth embodiment together with FIG. 13, and is a diagram illustrating spherical aberration, astigmatism, and distortion in a wide angle end state.
Figure 13:
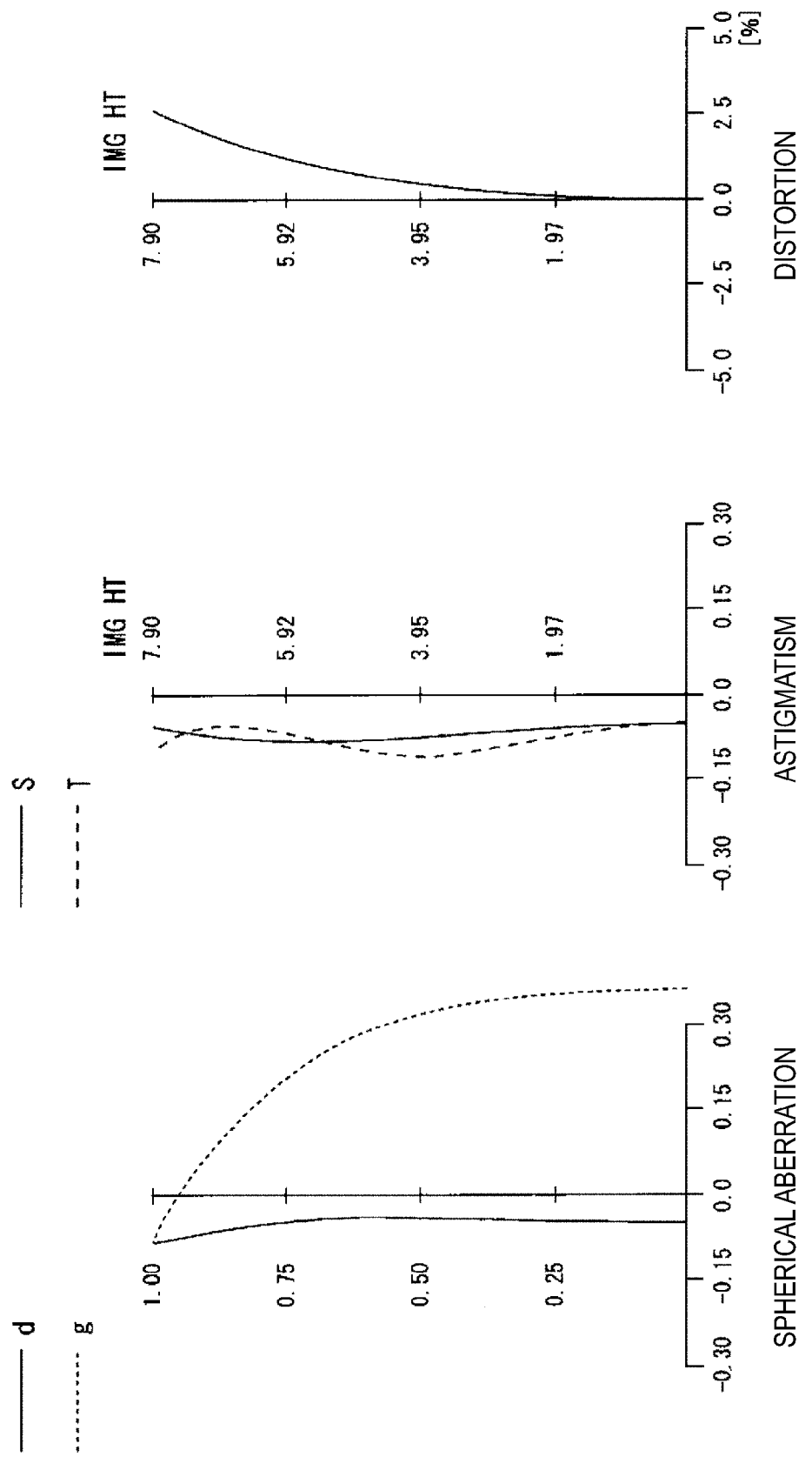
FIG. 13 is a diagram illustrating spherical aberration, astigmatism, and distortion in a telephoto end state.

FIGS. 12 and 13 illustrate various aberration diagrams in a state of shooting at infinity in the fifth numerical example. FIG. 12 illustrates various aberration diagrams in a wide angle end state, and FIG. 13 illustrates various aberration diagrams in a telephoto end state.

In FIGS. 12 and 13, in a spherical aberration diagram, a solid line represents a value on a d line (a wavelength of 587.6 nm), and a dotted line represents a value on a g line (a wavelength of 435.8 nm). Further, in an astigmatism diagram, a solid line represents a value on a sagittal imaging plane, and a dotted line represents a value on a meridional imaging plane.

It can be understood from the respective aberration diagrams that in the fifth numerical example, various aberrations are successfully corrected, and thus excellent imaging performance is obtained. [Values of Conditional Expressions of Lens Optical Unit]

Next, values of the conditional expressions of the lens optical unit according to the present technology will be described.

Table 16 represents values of the conditional expressions (1) to (4) in the lens optical units 1 to 4.

TABLE 16

|  |  | Lens optical unit 1 | Lens optical unit 2 | Lens optical unit 3 | Lens optical unit 4 |
|---|---|---|---|---|---|
| Conditional expression (1) | ρ × Sag | >0 | >0 | >0 | >0 |
| Conditional expression (2) | ρ | −0.0175 | −0.0134 | −0.0154 | −0.0121 |
| Conditional expression (3) | $θ_{max}$ | 9.58 | 17.74 | 16.91 | 17.10 |
| Conditional expression (4) | $R_{img}/f_{inf}$ | −1.934 | −2.743 | −2.354 | −4.006 |

Table 17 represents values of the conditional expressions (1) to (4) in the lens optical unit 5.

TABLE 17

|  |  | Lens optical unit 5 |
|---|---|---|
| Conditional expression (1) | ρ × Sag | >0 |
| Conditional expression (2) | ρ | −0.0214 |
| Conditional expression (3) | $θ_{max}$ (wide angle end) | 42.23 |
|  | $θ_{max}$ (telephoto end) | 22.74 |
| Conditional expression (4) | $R_{img}/f_{inf}$ (wide angle end) | −4.633 |
|  | $R_{img}/f_{inf}$ (telephoto end) | −2.028 |

As can be seen from Tables 16 and 17, the lens optical units 1 to 5 satisfy the conditional expressions (1) to (4).

[Configuration of Imaging Device]

An imaging device of the present technology has a lens optical unit in which at least one lens R is arranged at an object side of a solid-state image sensor, and an imaging plane IMG of the solid-state image sensor has a non-planar shape that causes a sag amount d in an optical axis direction to increase as a distance from an optical axis increases as illustrated in FIG. 1. A cover glass CG is arranged at the object side of the imaging plane IMG.

FIG. 1 illustrates the example in which the imaging plane IMG is formed in the non-planar shape concave to the object side. However, the imaging plane IMG may be formed in a non-planar shape which is convex to the object side as illustrated in FIG. 2.

The imaging plane IMG may not have the shape that is rotationally symmetric about the optical axis and may not have a spherical shape.

When the lens optical unit has the above configuration, even when a large field curvature aberration occurs in the lens optical unit, it is possible to match an imaging plane with an image plane at which an optimal resolution of an optical image is obtained, and thus the excellent resolution can be secured in the entire screen from the center of an image or a video to the most peripheral part (the outermost circumferential part).

Further, in the imaging device according to the present technology, the lens optical unit is configured to satisfy the following conditional expression (1).

$$ρ×Sag>0 \qquad (1)$$

ρ: Petzval curvature of an optical unit represented by ρ:

$$\rho = \sum_k \frac{1}{r_k} \cdot \left(\frac{1}{n'_k} - \frac{1}{n_k}\right)$$

$r_k$: curvature radius of a $k^{th}$ lens surface from the object side $n_k$: refractive index of a medium before being incident on the $k^{th}$ lens surface from the object side $n'_k$: refractive index of a medium after being emitted from the $k^{th}$ lens surface from the object side Sag: sag amount (an image side direction is positive) in the optical axis direction related to a given point other than the optical axis in the imaging plane The conditional expression (1) is a formula to specify a state of the field curvature aberration taken by the lens optical unit and an optimal condition of the non-planar shape taken by the imaging plane of the solid-state image sensor.

Here, when the conditional expression (1) is too small and falls below a lower limit, a direction of the field curvature of the lens optical unit and a direction of the shape of the imaging plane of the solid-state image sensor change in opposite directions to each other, and thus fatal degradation in the image quality is caused.

Thus, when the lens optical unit satisfies the conditional expression (1), the direction of the field curvature of the lens optical unit and the direction of the shape of the imaging plane of the solid-state image sensor do not change in the opposite directions to each other, and thus the field curvature aberration is successfully corrected, and the image quality is improved.

Further, in the imaging device of the present technology, in the lens optical unit, the imaging plane IMG is formed in the non-planar shape in which the sag amount d in the optical axis direction increases as the distance from the optical axis increases, and as the conditional expression (1) is satisfied, the restriction of an incident light ray on the imaging plane IMG is reduced, and thus the number of lenses can be reduced.

Thus, size reduction can be implemented, and high optical performance can be secured.

[Embodiment of Imaging Device]

Figure 14:
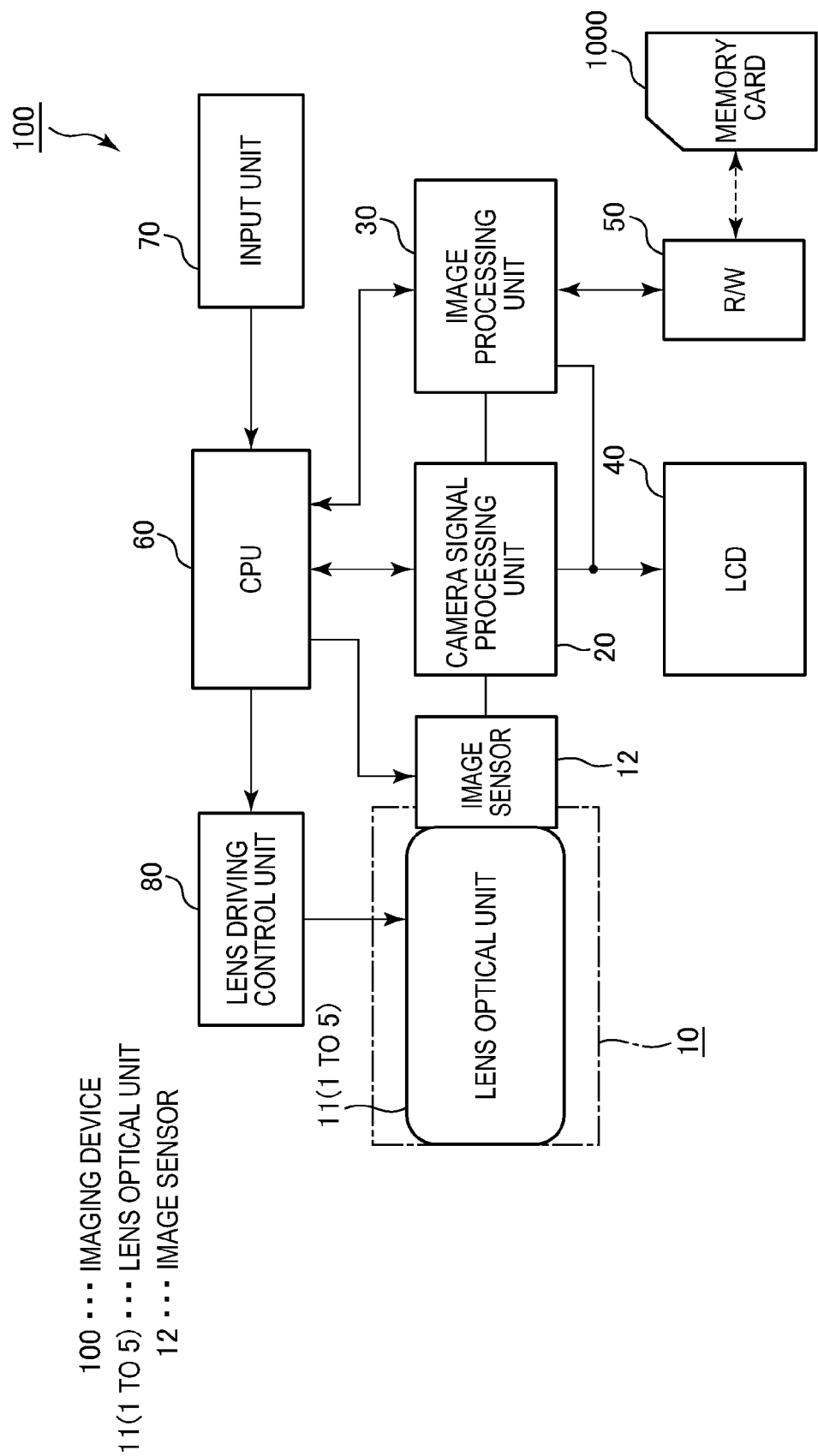
FIG. 14 is a block diagram illustrating an example of an imaging device.

FIG. 14 is a block diagram of a digital still camera according to an embodiment of an imaging device of the present technology.

The imaging device (digital still camera) 100 includes a camera block 10 which undertakes an imaging function, a camera signal processing unit 20 that performs signal processing such as analog-to-digital conversion on a captured image signal, and an image processing unit 30 that performs a recording/reproducing process on the image signal. The imaging device 100 further includes a liquid crystal display (LCD) 40 that displays a captured image and the like, a reader/writer (R/W) 50 that reads/writes the image signal from/in a memory card 1000, a central processing unit (CPU) 60 that controls the entirety of the imaging device, an input unit 70 that includes various kinds of switches through which a necessary operation is performed by the user, and a lens driving control unit 80 that controls driving of a lens arranged in the camera block 10.

The camera block 10 is configured with an optical unit including a lens optical unit 11 (the lens optical units 1 to 5 to which the present technology is applied), an imaging element 12 of a charge coupled device (CCD) type, a complementary metal-oxide semiconductor (CMOS) type, or the like, and the like.

The camera signal processing unit 20 performs various kinds of signal processing such as processing of converting an output signal from the imaging element 12 into a digital signal, noise reduction, image quality correction, and conversion into a brightness/color-difference signal.

The image processing unit 30 performs a compression coding/decompression decoding process of an image signal, a conversion process of a data specification such as the resolution, and the like, based on a predetermined data format.

The LCD 40 has a function of displaying an operation state in which the user operates the input unit 70, various kinds of data such as a captured image, and the like.

The R/W 50 writes image data encoded by the image processing unit 30 in the memory card 1000 and reads image data recorded in the memory card 1000.

The CPU 60 serves as a control processing unit that controls the respective circuit blocks disposed in the imaging device 100, and controls the respective circuit blocks based on an instruction input signal from the input unit 70.

For example, the input unit 70 includes a shutter release button to perform a touch operation, a selection switch to select an operation mode, and the like, and outputs the instruction input signal corresponding to the user's operation to the CPU 60.

The lens driving control unit 80 controls, for example, a motor (not shown) that drives each lens of the lens optical unit 11 based on a control signal from the CPU 60.

For example, the memory card 1000 is a removable semiconductor memory which is attachable to a slot connected to the R/W 50.

Next, an operation of the imaging device 100 will be described.

In a shooting standby state, under control of the CPU 60, an image signal captured by the camera block 10 is output to the LCD 40 via the camera signal processing unit 20, and then displayed as a camera-through image. At this time, when an instruction input signal for zooming is input from the input unit 70, the CPU 60 outputs a control signal to the lens driving control unit 80, and a predetermined lens of the lens optical unit 11 moves based on control of the lens driving control unit 80.

Further, when a shutter (not shown) of the camera block 10 operates in response to an instruction input signal from the input unit 70, a captured image signal is output from the camera signal processing unit 20 to the image processing unit 30 and is then converted into digital data of a predetermined data format by a compression coding process. The converted data is output to the R/W 50, and then written in the memory card 1000.

Focusing is performed such that the lens driving control unit 80 moves a predetermined lens of the lens optical unit 11 based on the control signal from the CPU 60, for example, when the shutter release button of the input unit 70 is pressed halfway or when the shutter release button is fully pressed for recording (shooting).

Further, when image data recorded in the memory card 1000 is reproduced, the R/W 50 reads predetermined image data from the memory card 1000 in response to an operation on the input unit 70, and the read image data is subjected to a decompression decoding process by the image processing unit 30 and then output to the LCD 40 as a reproducing image signal, so that a reproduced image is displayed on the LCD 40.

The above embodiments have been described in connection with the example in which the imaging device is applied to the digital still camera. However, an application of the imaging device is not limited to the digital still camera, and can be widely applied as a camera part of a digital input/ output device such as digital video cameras, mobile telephones with built-in cameras, and personal digital assistants (PDA) with built-in cameras.

[Others]

In the imaging device of the present technology and the lens optical unit according to the present technology, a lens substantially having no lens power may be additionally arranged, or a lens group including this lens may be additionally arranged. In this case, the imaging device of the present technology and the lens optical unit according to the present technology may be configured with lens groups which are equal in number to the substantially added number including the additionally arranged lens group.

[The Present Technology]

Additionally, the present technology may also be configured as below.

<1> A lens optical unit, comprising:

at least one lens that is arranged at an object side of a solid-state image sensor, wherein an imaging plane of the solid-state image sensor has a non-planar shape that causes a sag amount in an optical axis direction to increase as a distance from an optical axis increases, and a conditional expression (1) is satisfied:

$$\rho \times Sag > 0, \quad (1)$$

where $\rho$ represents a Petzval curvature of an optical unit represented by $\rho$:

$$\rho = \sum_k \frac{1}{r_k} \cdot \left( \frac{1}{n'_k} - \frac{1}{n_k} \right)$$

$r_k$ represents a curvature radius of a $k^{th}$ lens surface from the object side, $n_k$ represents a refractive index of a medium before being incident to the $k^{th}$ lens surface from the object side, $n'_k$ represents a refractive index of a medium after being emitted from the $k^{th}$ lens surface from the object side, and Sag represents a sag amount (an image side direction is positive) in the optical axis direction related to a given point other than the optical axis on the imaging plane.

<2> The lens optical unit according to <1>, wherein a conditional expression (2) is satisfied:

$$\rho < 0. \quad (2)$$

<3> The lens optical unit according to <1> or <2>, wherein the non-planar shape of the imaging plane in the solid-state image sensor is a curved surface shape that is rotationally symmetric about the optical axis.

<4> The lens optical unit according to any one of <1> to <3>, wherein an angle at which a main light ray having a maximum angle of field is incident to the imaging plane in a state of shooting at infinity in an entire zoom area satisfies a conditional expression (3):

$$\theta_{max} < 45° \quad (3)$$

where $\theta_{max}$ represents an angle at which a main light ray having a maximum angle of field is incident to the imaging plane (vertical incidence is set to 0°).

<5> The lens optical unit according to <3> or <4>, wherein the entire imaging plane of the solid-state image sensor has a spherical shape with the same curvature.

<6> The lens optical unit according to any one of <1> to <5>, wherein the imaging plane of the solid-state image sensor and a focal length of the optical unit satisfy a conditional expression (4):

$$-5.0 < R_{img}/f_{inf} < -1.0, \quad (4)$$

where $R_{img}$ represents a curvature radius of the imaging plane of the solid-state image sensor, and $f_{inf}$ represents a focal length of the optical unit at the time of focusing at infinity.

<7> The lens optical unit according to any one of <1> to <6>, wherein a total of four lenses including two positive lenses and two negative lenses are arranged as the lens.

<8> The lens optical unit according to any one of <1> to <7>, wherein a lens closest to an image side is a concave meniscus lens having a shape which is convex toward the image side.

<9> The lens optical unit according to any one of <1> to <8>, wherein an aspheric surface is formed on a lens surface closest to the image side.

<10> An imaging device, comprising:

a lens optical unit; and a solid-state image sensor that converts an optical image formed by the lens optical unit into an electrical signal, wherein the lens optical unit includes at least one lens arranged at an object side of the solid-state image sensor, an imaging plane of the solid-state image sensor has a non-planar shape that causes a sag amount in an optical axis direction to increase as a distance from an optical axis increases, and a conditional expression (1) is satisfied:

$$\rho \times Sag > 0, \quad (1)$$

where $\rho$ represents a Petzval curvature of an optical unit represented by $\rho$:

$$\rho = \sum_k \frac{1}{r_k} \cdot \left( \frac{1}{n'_k} - \frac{1}{n_k} \right)$$

$r_k$ represents a curvature radius of a $k^{th}$ lens surface from the object side, $n_k$ represents a refractive index of a medium before being incident to the $k^{th}$ lens surface from the object side, $n'_k$ represents a refractive index of a medium after being emitted from the $k^{th}$ lens surface from the object side, and Sag represents a sag amount (an image side direction is positive) in the optical axis direction related to a given point other than the optical axis in the imaging plane.

<11> The lens optical unit according to any one of <1> to <9> or the imaging device according to <10>, further comprising a lens that substantially has no lens power.

The shape of each component and a numerical value mentioned in the above embodiments is merely one example of an implementation for embodying the present technology, and is not intended to cause the technical scope of the present technology to be interpreted in a limited way.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-199649 filed in the Japan Patent Office on Sep. 13, 2011, the entire content of which is hereby incorporated by reference.

What is claimed is:

1. A lens optical unit, comprising:

at least one lens that is arranged at an object side of a solid-state image sensor, wherein an imaging plane of the solid-state image sensor has a non-planar shape that causes a sag amount in an optical axis direction to increase as a distance from an optical axis increases, and a conditional expression (1) is satisfied:

$$\rho \times Sag > 0, \quad (1)$$

where $\rho$ represents a Petzval curvature of an optical unit represented by $\rho$:

$$\rho = \sum_k \frac{1}{r_k} \cdot \left( \frac{1}{n'_k} - \frac{1}{n_k} \right)$$

$r_k$ represents a curvature radius of a $k^{th}$ lens surface from the object side, $n_k$ represents a refractive index of a medium before being incident to the $k^{th}$ lens surface from the object side, $n'_k$ represents a refractive index of a medium after being emitted from the $k^{th}$ lens surface from the object side, and Sag represents a sag amount (an image side direction is positive) in the optical axis direction related to a given point other than the optical axis on the imaging plane.

2. The lens optical unit according to claim 1, wherein a conditional expression (2) is satisfied:

$$\rho < 0. \quad (2)$$

3. The lens optical unit according to claim 1, wherein the non-planar shape of the imaging plane in the solid-state image sensor is a curved surface shape that is rotationally symmetric about the optical axis.

4. The lens optical unit according to claim 1, wherein an angle at which a main light ray having a maximum angle of field is incident to the imaging plane in a state of shooting at infinity in an entire zoom area satisfies a conditional expression (3):

$$\theta_{max} < 45°, \quad (3)$$

where $\theta_{max}$ represents an angle at which a main light ray having a maximum angle of field is incident to the imaging plane (vertical incidence is set to 0°).

5. The lens optical unit according to claim 3, wherein the entire imaging plane of the solid-state image sensor has a spherical shape with the same curvature.

6. The lens optical unit according to claim 1, wherein the imaging plane of the solid-state image sensor and a focal length of the optical unit satisfy a conditional expression (4):

$$-5.0 < R_{img}/f_{inf} < -1.0, \quad (4)$$

where $R_{img}$ represents a curvature radius of the imaging plane of the solid-state image sensor, and $f_{inf}$ represents a focal length of the optical unit at the time of focusing at infinity.

7. The lens optical unit according to claim 1, wherein a total of four lenses including two positive lenses and two negative lenses are arranged as the lens.

8. The lens optical unit according to claim 1, wherein a lens closest to an image side is a concave meniscus lens having a shape which is convex toward the image side.

9. The lens optical unit according to claim 1, wherein an aspheric surface is formed on a lens surface closest to the image side.

10. An imaging device, comprising:
a lens optical unit; and
a solid-state image sensor that converts an optical image formed by the lens optical unit into an electrical signal,
wherein the lens optical unit includes at least one lens arranged at an object side of the solid-state image sensor,
an imaging plane of the solid-state image sensor has a non-planar shape that causes a sag amount in an optical axis direction to increase as a distance from an optical axis increases, and a conditional expression (1) is satisfied:

$$\rho \times Sag > 0, \quad (1)$$

where $\rho$ represents a Petzval curvature of an optical unit represented by $\rho$:

$$\rho = \sum_k \frac{1}{r_k} \cdot \left( \frac{1}{n'_k} - \frac{1}{n_k} \right)$$

$r_k$ represents a curvature radius of a $k^{th}$ lens surface from the object side, $n_k$ represents a refractive index of a medium before being incident to the $k^{th}$ lens surface from the object side, $n'_k$ represents a refractive index of a medium after being emitted from the $k^{th}$ lens surface from the object side, and Sag represents a sag amount (an image side direction is positive) in the optical axis direction related to a given point other than the optical axis in the imaging plane.

\* \* \* \* \*